US007615264B2

(12) United States Patent
Fukagawa et al.

(10) Patent No.: US 7,615,264 B2
(45) Date of Patent: Nov. 10, 2009

(54) CELLULOSE ACYLATE FILM, POLARIZING PLATE, AND LIQUID CRYSTAL DISPLAY DEVICE

(75) Inventors: Nobutaka Fukagawa, Minami-ashigara (JP); Shigeo Uehira, Minami-ashigara (JP); Yutaka Nozoe, Minami-ashigara (JP); Kunihiro Atsumi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 424 days.

(21) Appl. No.: 11/443,267

(22) Filed: May 31, 2006

(65) Prior Publication Data

US 2006/0275560 A1    Dec. 7, 2006

(30) Foreign Application Priority Data

Jun. 1, 2005 (JP) ............................. 2005-160934
Apr. 25, 2006 (JP) ............................. 2006-121351

(51) Int. Cl.
*C09K 19/02* (2006.01)
(52) U.S. Cl. .................. 428/1.33; 428/1.31; 349/96; 349/117; 252/299.01
(58) Field of Classification Search ............. 428/1.3, 428/1.31, 1.33; 252/299.01; 349/96, 117
See application file for complete search history.

(56) References Cited

U.S. PATENT DOCUMENTS

2005/0106334 A1*  5/2005  Kubo et al. ............. 428/1.31

FOREIGN PATENT DOCUMENTS

JP    2003-344655 A    12/2003

OTHER PUBLICATIONS

Gong, B. et. al. PNAS, vol. 99, No. 18, 2002, p. 11583-11588.*

* cited by examiner

Primary Examiner—David R Sample
Assistant Examiner—Sophie Hon
(74) Attorney, Agent, or Firm—Buchanan Ingersoll & Rooney PC

(57) ABSTRACT

A cellulose acylate film comprising a compound having a hydrogen-donating group capable of forming a hydrogen bond and an aromatic ring, and a compound represented by the following formula:

$$R^{13}O\text{-}\underset{R^4\ R^5}{\underset{|}{\bigcirc}}\text{-}\overset{R^2\ OR^{11}}{\underset{}{}}\text{-}\overset{O}{\overset{\|}{C}}\text{-}L^1\text{-}(Ar^1\text{-}L^2)_n\text{-}Ar^2$$

wherein $R^2$, $R^4$, and $R^5$ represent H or a substituent, $R^{11}$ and $R^{13}$ represent H or an alkyl group, $L^1$ and $L^2$ represent a single bond or a divalent linking group, $Ar^1$ represents an arylene group or a divalent aromatic heterocyclic group, $Ar^2$ represents an aryl group or a monovalent aromatic heterocyclic group, n represents an integer of 3 or more.

11 Claims, 1 Drawing Sheet

CELLULOSE ACYLATE FILM, POLARIZING PLATE, AND LIQUID CRYSTAL DISPLAY DEVICE

BACKGROUND OF THE INVENTION

1. Field of the Invention

The present invention relates to a cellulose acylate film, and a polarizing plate and liquid crystal display device using the film.

2. Description of the Related Art

Cellulose acylate films have appropriate water permeability and high optical isotropy (low retardation values), and thereby have been widely used as protective films for polarizing plates of liquid crystal display devices.

Recently proposed are methods for preparing cellulose acylate films having optical compensatory function in addition to function as polarizing plate protective films by forming phase difference in the films.

In the case of using the cellulose acylate films as optical compensatory films for VA mode liquid crystal display devices, expanding its market rapidly, not only the in-plane retardation (hereinafter referred to as Re) but also the retardation in the thickness direction have to be high.

As methods for increasing the retardation in the thickness direction (hereinafter referred to as Rth) of the cellulose acylate films, methods of reducing the total acylation degree of cellulose acylate, methods of adding a retarder, etc. have been known. With respect to the latter methods, a cellulose acylate film containing a triazine compound added is disclosed in JP-A-2003-344655.

However, the cellulose acylate films have a certain level of water absorptivity, and thus the retardation of the films is changed by environmental humidity. This causes a problem that, when the cellulose acylate films are used as the optical compensatory films of the liquid crystal display devices, the image qualities of the devices are changed depending on the environmental humidity. Therefore, there has been a strong demand for improving the change.

SUMMARY OF THE INVENTION

An object of the present invention is to provide a cellulose acylate film having high retardation values and small retardation changes due to humidity.

Another object of the invention is to provide a polarizing plate and a liquid crystal display device that use the cellulose acylate film as an optical compensatory film to achieve high display qualities.

It is known that water absorptivity of cellulose acylate films can be reduced by adding a hydrophobic compound such as a plasticizer. However, as a result of intense research, the inventors have found that, in the case of adding the above mentioned triazine compound together with another hydrophobic compound to a cellulose acylate film, the retardation properties are deteriorated. Further, the inventors have found out that the retardation properties of the triazine compound are reduced in the presence of the hydrophobic compound because the alignment of the triazine compound is inhibited by the hydrophobizing agent in the cellulose acylate film.

Based on the above investigation, the inventors have found that the alignment is not inhibited due to the hydrophobic compound in the case of using a retarder with high self-associating property, to achieve both the higher retardation and smaller retardation changes by humidity. The invention has been accomplished by the finding.

Specifically, the above problem has been solved by the following ones.

(1) A cellulose acylate film comprising a compound having a hydrogen-donating group capable of forming a hydrogen bond and an aromatic ring, and at least one compound represented by the following formula (1):

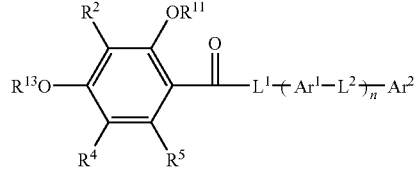

Formula (1)

wherein $R^2$, $R^4$, and $R^5$ each represent a hydrogen atom or a substituent, $R^{11}$ and $R^{13}$ each represent a hydrogen atom or an alkyl group, $L^1$ and $L^2$ each represent a single bond or a divalent linking group, $Ar^1$ represents an arylene group or a divalent aromatic heterocyclic group, $Ar^2$ represents an aryl group or a monovalent aromatic heterocyclic group, n represents an integer of 3 or more, and $L^2$'s and $Ar^1$'s in the n units may be the same or different ones respectively.

(2) The cellulose acylate film according to (1), wherein the compound having a hydrogen-donating group capable of forming a hydrogen bond and an aromatic ring is represented by the following formula (2):

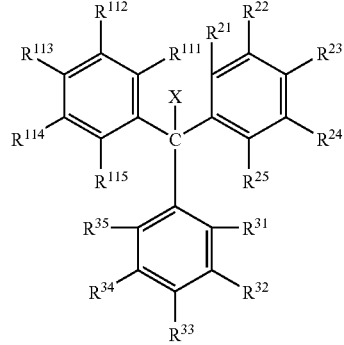

Formula (2)

wherein X represents a substituted or unsubstituted amino group, a substituted or unsubstituted acylamino group, a substituted or unsubstituted alkoxycarbonylamino group, a substituted or unsubstituted aryloxycarbonylamino group, a substituted or unsubstituted sulfonylamino group, a hydroxyl group, a mercapto group, or a carboxyl group, and $R^{111}$, $R^{112}$, $R^{113}$, $R^{114}$, $R^{115}$, $R^{21}$, $R^{22}$, $R^{23}$, $R^{24}$, $R^{25}$, $R^{31}$, $R^{32}$, $R^{33}$, $R^{34}$, and $R^{35}$ each represent a hydrogen atom or a substituent.

(3) The cellulose acylate film according to (1) or (2), wherein the compound having at least one hydrogen-donating group capable of forming a hydrogen bond and at least one aromatic ring is represented by the following formula (B):

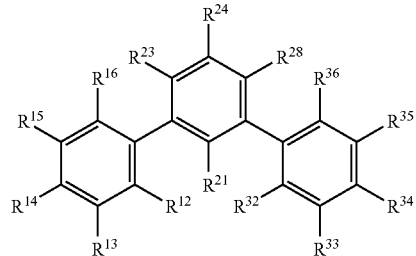

Formula (B)

wherein $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$ and $R^{36}$ represent a hydrogen atom or a substituent, at least one of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$ and $R^{36}$ is an amino group, an acylamino group, an alkoxycarbonylamino group, an aryloxycarbonylamino group, a sulfonylamino group, a hydroxyl group, a mercapto group or a carboxyl group.

(4) The cellulose acylate film according to any one of (1) to (3), wherein the cellulose acylate film satisfies the following inequalities (A) and (B):

$$20\ nm \leq Re_{(590)} \leq 250\ nm \quad (A)$$

$$40\ nm \leq Rth_{(590)} \leq 400\ nm \quad (B)$$

wherein $Re_{(590)}$ and $Rth_{(590)}$ represent an in-plane retardation (Re) and a retardation in the thickness direction (Rth) at a wavelength of 590 nm, respectively.

(5) The cellulose acylate film according to any one of (1) to (4), wherein the cellulose acylate film satisfies the following condition:

$$0\% \leq (Rth_{(590)}\ under\ 25°\ C.\ and\ 10\%\ RH - Rth_{(590)}\ under\ 25°\ C.\ and\ 80\%\ RH)/Rth_{(590)}\ under\ 25°\ C.\ and\ 60\%\ RH \leq 30\%$$

wherein $Rth_{(590)}$ represents a retardation in the thickness direction (Rth) at a wavelength of 590 nm.

(6) An optical compensatory film comprising the cellulose acylate film according to any one of (1) to (5).

(7) A polarizing plate comprising a polarizing film and protective films disposed on the both sides of the polarizing film, wherein at least one of the protective films is the cellulose acylate film according to any one of (1) to (5).

(8) A liquid crystal display device comprising a liquid crystal cell and 2 polarizing plates disposed on the both sides of the liquid crystal cell, wherein at least one of the polarizing plates is the polarizing plate according to (7).

(9) The liquid crystal display device according to (8), wherein the display mode of the display device is a VA mode.

(10) The liquid crystal display device according to (8), wherein the display mode of the display device is an OCB mode.

The cellulose acylate film of the invention is characterized by high Re, high Rth, and small retardation change by environmental humidity. Thus, the cellulose acylate film of the invention can be preferably used as an optical compensatory film. Particularly, in the case of using the cellulose acylate film of the invention in a polarizing plate, the resultant polarizing plate can show an additional optical compensatory function without increasing the components. Further, by using the polarizing plate, a liquid crystal display device with high display qualities can be obtained.

BEST MODE FOR CARRYING OUT THE INVENTION

Figure 1:
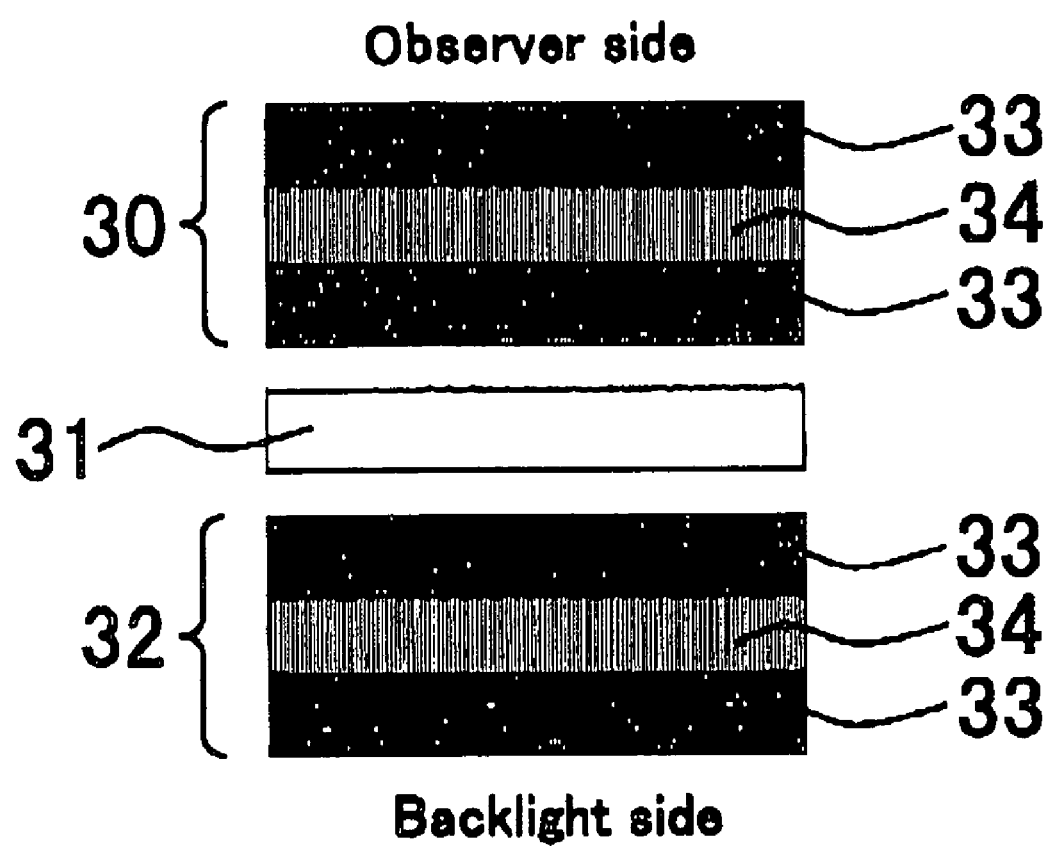
FIG. 1 is a schematic view showing a liquid crystal display device produced in Example 5.

The present invention is described in detail below. Each component of the invention may be described in some cases based on a typical embodiment without intention of restricting the scope of the invention. It should be noted that, in the invention, a numeric range represented by "A to B" means a range including both the numeric values A and B as the minimum and maximum values.

Further, in the invention, when a group has a substituent, the term "the carbon number of the group" means the number of carbon atoms in the group other than carbon atoms in the substituent.

[Cellulose Acylate Film]

The cellulose acylate film of the invention contains a retarder having a high associating property (a compound represented by the formula (1)) and a hydrophobizing agent (a compound having a hydrogen-donating group capable of forming a hydrogen bond and an aromatic ring). The retarder, the hydrophobizing agent, cellulose acylate, and a method for producing the cellulose acylate film are described in this order below.

(Retarder)

The retarder used in the invention is the compound represented by the following formula (1). The retarder has a high associating property and thereby is preferred. The compound represented by the formula (1) is described in detail below.

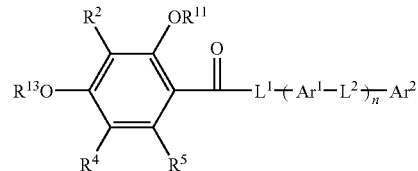

Formula (1)

In the formula (1), $R^2$, $R^4$, and $R^5$ each represent a hydrogen atom or a substituent, $R^{11}$ and $R^{13}$ each represent a hydrogen atom or an alkyl group, and $L^1$ and $L^2$ each represent a single bond or a divalent linking group. $Ar^1$ represents an arylene group or a divalent aromatic heterocyclic group, $Ar^2$ represents an aryl group or a monovalent aromatic heterocyclic group, n represents an integer of 3 or more, ard $L^2$'s and $Ar^1$'s in the n units may be the same or different ones respectively.

In the formula (1), $R^2$, $R^4$ and $R^5$ each represent a hydrogen atom or a substituent, which may be a substituent T to be hereinafter described.

$R^2$ is preferably a hydrogen atom, an alkyl group (preferably an alkyl group having 1 to 4 carbon atoms, more preferably a methyl group), an alkoxy group (which preferably has 1 to 12 carbon atoms, more preferably has 1 to B carbon atoms, further preferably has 1 to 6 carbon atoms, particularly preferably has 1 to 4 carbon atoms), an amino group, or a hydroxyl group, more preferably a hydrogen atom, an alkyl group, or an alkoxy group, further preferably a hydrogen atom, a methyl group, or a methoxy group, and the most preferably a hydrogen atom.

$R^5$ is preferably a hydrogen atom, a halogen atom (preferably a chlorine atom or a fluorine atom), an alkyl group (preferably an alkyl group having 1 to 4 carbon atoms, more preferably a methyl group), an alkoxy group (which preferably has 1 to 12 carbon atoms, more preferably has 1 to 8 carbon atoms, further preferably has 1 to 6 carbon atoms, particularly preferably has 1 to 4 carbon atoms), an amino group, or a hydroxyl group, more preferably a hydrogen atom, an alkyl group, or an alkoxy group, further preferably a hydrogen atom, an alkyl group, or an alkoxy group, particularly preferably a hydrogen atom, a methyl group, or a methoxy group, most preferably a hydrogen atom.

It is particularly preferred that both $R^2$ and $R^5$ are hydrogen atoms.

$R^4$ is preferably a hydrogen atom or an electron-donating group, more preferably a hydrogen atom, an alkyl group, an alkoxy group, an amino group, or a hydroxyl group, further preferably a hydrogen atom, an alkyl group, or an alkoxy group, particularly preferably a hydrogen atom or an alkoxy group.

The alkyl group of $R^4$ preferably has 1 to 4 carbon atoms, more preferably has 1 to 3 carbon atoms.

The alkoxy group of $R^4$ preferably has 1 to 12 carbon atoms, more preferably has 1 to 8 carbon atoms, further preferably has 1 to 6 carbon atoms, still further preferably has 1 to 4 carbon atoms, particularly preferably has 1 to 3 carbon atoms, most preferably has 1 carbon atom.

$R^{11}$ and $R^{13}$ each represent a hydrogen atom or an alkyl group. The alkyl group of $R^{11}$ or $R^{13}$ is a straight, branched, or cyclic, substituted or unsubstituted, alkyl group, preferably a substituted or unsubstituted alkyl group having 1 to 30 carbon atoms, a substituted or unsubstituted cycloalkyl group having 3 to 30 carbon atoms, a substituted or unsubstituted bicycloalkyl group having 5 to 30 carbon atoms (a monovalent group provided by removing one hydrogen atom from a bicycloalkane having 5 to 30 carbon atoms), or a tricyclo structure with more rings.

Preferred examples of the alkyl groups of $R^{11}$ and $R^{13}$ include a methyl group, ethyl group, n-propyl group, isopropyl group, n-butyl group, sec-butyl group, t-butyl group, n-pentyl group, iso-pentyl group, n-hexyl group, n-heptyl group, n-octyl group, tert-octyl group, 2-ethylhexyl group, n-nonyl group, 1,1,3-trimethylhexyl group, n-decyl group, 2-hexyldecyl group, cyclohexyl group, cycloheptyl group, 2-hexenyl group, oleyl group, linoleyl group, and linolenyl group. Further, the cycloalkyl groups include cyclohexyl, cyclopentyl, and 4-n-dodecylcyclohexyl groups, and the bicycloalkyl groups include bicyclo[1,2,2]heptane-2-yl and bicyclo[2,2,2]octane-3-yl groups.

$R^{11}$ is further preferably a hydrogen atom, a methyl group, an ethyl group, an n-propyl group, or an isopropyl group, particularly preferably a hydrogen atom or a methyl group, most preferably a methyl group.

$R^{13}$ is particularly preferably an alkyl group having 2 or more carbon atoms, more preferably an alkyl group having 3 or more carbon atoms. An alkyl group having a branched or cyclic structure is particularly preferred.

Specific examples of the alkyl group of $R^{13}$ are illustrated below without intention of restricting the scope of the invention. In the following examples, each # means a position connecting to the oxygen atom.

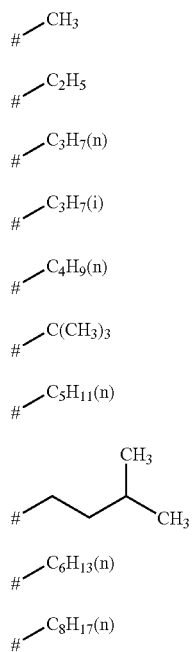

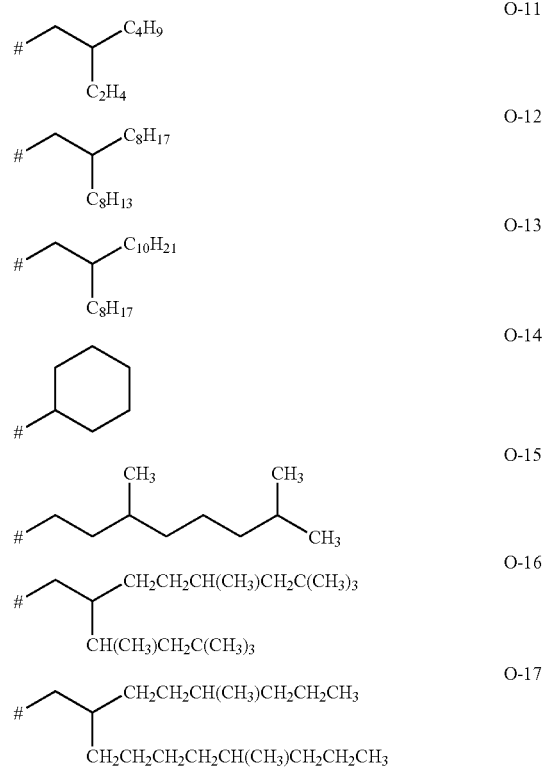

$Ar^1$ represents a divalent arylene group or an aromatic heterocycle, and $Ar^1$'s in the repeating units may be the same or different groups. $Ar^2$ represents an aryl group or a monovalent aromatic heterocycle.

The arylene group of $Ar^1$ is preferably an arylene group having 6 to 30 carbon atoms, may be monocyclic, and may be bonded to another ring to form a condensed ring. The arylene group may have a substituent if possible, and the substituent may be the substituent T to be hereinafter described. The arylene group of $Ar^1$ more preferably has 6 to 20 carbon atoms, and particularly preferably has 6 to 12 carbon atoms, and examples thereof include a phenylene group, a p-methylphenylene group, and a naphthylene group.

The aryl group of $Ar^2$ is preferably an aryl group having 6 to 30 carbon atoms, and may be monocyclic, and may be bonded to another ring to form a condensed ring. The aryl group may have a substituent if possible, and the substituent may be the substituent T to be hereinafter described. The aryl group of $Ar^2$ more preferably has 6 to 20 carbon atoms, and particularly preferably has 6 to 12 carbon atoms, and examples thereof include a phenyl group, a p-methylphenyl group, and a naphthyl group.

The aromatic heterocycles of $Ar^1$ and $Ar^2$ may contain at least one of oxygen, nitrogen, and sulfur atoms, and are preferably 5- or 6-membered aromatic heterocycles containing at least one of oxygen, nitrogen, and sulfur atoms. The aromatic heterocycles may have a substituent if possible, and the substituent may be the substituent T to be hereinafter described.

Specific examples of the aromatic heterocycles of $Ar^1$ and $Ar^2$ include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzthiazole, benzotriazole, tetrazaindene, pyrrolotriazole, and pyrazolotriazole. Preferred aromatic heterocycles include benzimidazole, benzoxazole, benzthiazole, and benzotriazole.

$Ar^1$ is a divalent aromatic heterocycle having two connecting bonds and $Ar^2$ is a monovalent aromatic heterocycle having one connecting bond.

$L^1$ and $L^2$ independently represent a single bond or a divalent linking group. $L^1$ and $L^2$ may be the same or different ones, and $L^2$'s in the repeating units may be the same or different ones.

Preferred examples of the divalent linking groups include —O—, —NR— (hereinafter, R represents a hydrogen atom or an alkyl or aryl group that may have a substituent), —CO—, —SO$_2$—, —S—, alkylene groups, substituted alkylene groups, alkenylene groups, substituted alkenylene groups, alkynylene groups, and combinations of two or more thereof. More preferred divalent linking groups include —O—, —NR—, —CO—, —SO$_2$NR—, —NRSO$_2$—, —CONR—, —NRCO—, —COO—, —OCO—, and alkynylene groups. R is preferably a hydrogen atom.

In the invention, in the compound represented by the formula (1), $Ar^1$ is connected to $L^1$ and $L^2$. When $Ar^1$ is a phenylene group, each of $L^1$-$Ar^1$-$L^2$ and $L^2$-$Ar^1$-$L^2$ most preferably has para substitution (1,4-substitution) structure.

In the formula (1), n is an integer of 3 or more, preferably 3 to 7, more preferably 3 to 6, further preferably 3 to 5.

Compounds represented by the following formulae (4) and (5) can be particularly preferably used as the compound represented by the formula (1).

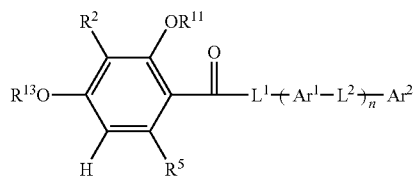

Formula (4)

In the formula (4), $R^2$ and $R^5$ independently represent a hydrogen atom or a substituent, $R^{11}$ and $R^{13}$ independently represent a hydrogen atom or an alkyl group, and $L^1$ and $L^2$ independently represent a single bond or a divalent linking group. $Ar^1$ represents an arylene group or a divalent aromatic heterocycle, $Ar^2$ represents an aryl group or a monovalent aromatic heterocycle, n represents an integer of 3 or more, and $L^2$'s and $Ar^1$'s in the n units may be the same or different ones respectively.

In the formula (4), $R^2$, $R^5$, $R^{11}$, and $R^{13}$ have the same meanings and preferred embodiments as those in the formula (1). Further, also $L^1$, $L^2$, $Ar^1$, and $Ar^2$ have the same meanings and preferred embodiments as those in the formula (1).

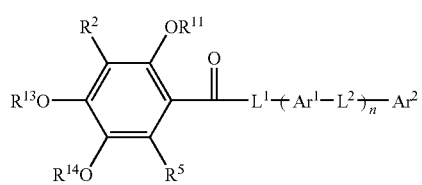

Formula (5)

In the formula (5), $R^2$ and $R^5$ independently represent a hydrogen atom or a substituent, $R^{11}$, $R^{13}$, and $R^{14}$ independently represent a hydrogen atom or an alkyl group, and $L^1$ and $L^2$ independently represent a single bond or a divalent linking group. $Ar^1$ represents an arylene group or a monovalent aromatic heterocycle, $Ar^2$ represents an aryl group or a divalent aromatic heterocycle, n represents an integer of 3 or more, and $L^2$'s and $Ar^1$'s in the n units may be the same or different ones respectively.

In the formula (5), $R^2$, $R^5$, $R^{11}$, and $R^{13}$ have the same meanings and preferred embodiments as those in the formula (1). Further, also $L^1$, $L^2$, $Ar^1$, and $Ar^2$ have the same meanings and preferred embodiments as those in the formula (1).

In the formula (5), $R^{14}$ represents a hydrogen atom or an alkyl group, and the alkyl group is preferably selected from the above-described preferred examples of the alkyl groups of $R^{11}$ and $R^{13}$. $R^{14}$ is preferably a hydrogen atom or an alkyl group having 1 to 4 carbon atoms, more preferably a hydrogen atom or an alkyl group having 1 to 3 carbon atoms, further preferably a methyl group. $R^{11}$ and $R^{14}$ may be the same or different ones, and are particularly preferably methyl groups.

Also compounds represented by the following formula (6-A) or (6-B) can be preferably used as the compound represented by the formula (1).

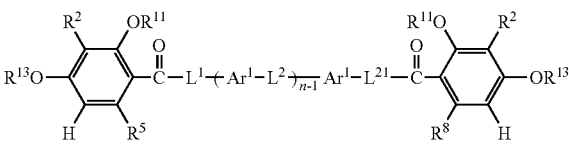

Formula (6-A)

In the formula (6-A), $R^2$ and $R^5$ independently represent a hydrogen atom or a substituent, $R^{11}$ and $R^{13}$ independently represent a hydrogen atom or an alkyl group, and $L^1$, $L^2$ and $L^{21}$ independently represent a single bond or a divalent linking group. $Ar^1$ represents an arylene group or a divalent aromatic heterocycle, n represents an integer of 3 or more, and $L^2$'s in the n-1 units and $Ar^1$'s in the n units may be the same or different ones respectively.

In the formula (6-A), $R^2$, $R^5$, $R^{11}$, $R^{13}$, $L^1$, $L^2$, $Ar^1$, and n have the same meanings and preferred embodiments as those in the formula (1). $L^{21}$ is preferably a single bond, —O—, —NR— (hereinafter, R represents a hydrogen atom or an alkyl or aryl group that may have a substituent), —CO—, —SO$_2$—, —S—, alkylene groups, substituted alkylene groups, alkenylene groups, substituted alkenylene groups, alkynylene groups, and combinations of two or more thereof, more preferably a single bond, —NR— and —O—.

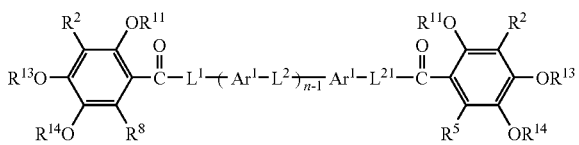

Formula (6-B)

In the formula (6-B), $R^2$ and $R^3$ independently represent a hydrogen atom or a substituent, $R^{11}$, $R^{13}$ and $R^{14}$ independently represent a hydrogen atom or an alkyl group, and $L^1$, $L^2$ and $L^{21}$ independently represent a single bond or a divalent linking group. $Ar^1$ represents an arylene group or a divalent aromatic heterocycle, n represents an integer of 3 or more, and $L^2$'s in the n-1 units and $Ar^1$'s in the n units may be the same or different ones respectively in the formula (6-B), $R^2$, $R^5$, $R^{11}$, $R^{13}$, $R^{14}$, $L^1$, $L^2$, $Ar^1$, and n have the same meanings and preferred embodiments as those in the formulae (1). $L^{21}$ is preferably a single bond, —O—, —NR— (hereinafter, R represents a hydrogen atom or an alkyl or aryl group that may have a substituent), —CO—, —SO$_2$—, —S—, alkylene groups, substituted alkylene groups, alkenylene groups, substituted alkenylene groups, alkynylene groups, and combinations of two or more thereof, more preferably a single bond, —NR— and —O—.

The above-mentioned substituent T is described below.

Preferred examples of the substituents T include halogen atoms such as a fluorine atom, chlorine atom, bromine atom, and iodine atom; alkyl groups, the carbon number thereof being preferably 1 to 30, such as a methyl group, ethyl group, n-propyl group, isopropyl group, t-butyl group, n-octyl group, and 2-ethylhexyl group; cycloalkyl groups, preferably substituted or unsubstituted cycloalkyl groups having a carbon number of 3 to 30, such as a cyclohexyl group, cyclopentyl group, 4-n-dodecylcyclohexyl group; bicycloalkyl groups, preferably substituted or unsubstituted bicycloalkyl groups having a carbon number of 5 to 30, i.e. monovalent groups provided by removing one hydrogen atom from bicycloalkanes having a carbon number of 5 to 30, such as a bicyclo[1,2,2]heptane-2-yl group and bicyclo[2,2,2]octane-3-yl group; alkenyl groups, preferably substituted or unsubstituted alkenyl groups having a carbon number of 2 to 30, such as a vinyl group and allyl group; cycloalkenyl groups, preferably substituted or unsubstituted cycloalkenyl groups having a carbon number of 3 to 30, i.e. monovalent groups provided by removing one hydrogen atom from cycloalkenes having a carbon number of 3 to 30, such as a 2-cyclopertene-1-yl group and 2-cyclohexene-1-yl; substituted or unsubstituted bicycloalkenyl groups, preferably substituted or unsubstituted bicycloalkenyl groups having a carbon number of 5 to 30, i.e. monovalent groups provided by removing one hydrogen atom from bicycloalkenes having one double bond, such as a bicyclo[2,2,1]hepto-2-ene-1-yl group and bicyclo[2,2,2] octo-2-ene-4-yl; alkynyl groups, preferably substituted or unsubstituted alkynyl groups having a carbon number of 2 to 30, such as an ethynyl group and propargyl group; aryl groups, preferably substituted or unsubstituted aryl groups having a carbon number of 6 to 30, such as a phenyl group, p-tolyl group, and naphtyl group; heterocyclic groups, preferably monovalent groups provided by removing one hydrogen atom from 5 or 6-membered, substituted or unsubstituted, aromatic or nonaromatic heterocycle compounds, more preferably 5 or 6-membered, aromatic heterocyclic groups having a carbon number of 3 to 30, such as a 2-furyl group, 2-thienyl group, 2-pyrimidinyl group, and 2-benzothiazolyl group; a cyano group; a hydroxyl group; a nitro group; a carboxyl group; alkoxy groups, preferably substituted or unsubstituted alkoxy groups having a carbon number of 1 to 30, such as a methoxy group, ethoxy group, isopropoxy group, t-butoxy group, n-octyloxy group, and 2-methoxyethoxy group; aryloxy groups, preferably substituted or unsubstituted aryloxy groups having a carbon number of 6 to 30, such as a phenoxy group, 2-methylphenoxy group, 4-tert-butylphenoxy group, 3-nitrophenoxy group, and 2-tetradecanoylaminophenoxy group; silyloxy groups, the carbon number thereof being preferably 3 to 20, such as a trimethylsilyloxy group and tert-butyldimethylsilyloxy group; heterocyclyloxy groups, preferably substituted or unsubstituted heterocyclyloxy groups having a carbon number of 2 to 30, such as a 1-phenyltetrazole-5-oxy group and 2-tetrahydropyranyloxy group; acyloxy groups, preferably a formyloxy group, substituted or unsubstituted alkylcarbonyloxy groups having a carbon number of 2 to 30, and substituted or unsubstituted arylcarbonyloxy groups having a carbon number of 6 to 30, such as a formyloxy group, acetyloxy group, pivaloyloxy group, stearoyloxy group, benzoyloxy group, and p-methoxyphenylcarbonyloxy group; carbamoyloxy groups, preferably substituted or unsubstituted carbamoyloxy groups having a carbon number of 1 to 30, such as an N,N-dimethylcarbamoyloxy group, N,N-diethylcarbamoyloxy group, morpholinocarbonyloxy group, N,N-di-n-octylaminocarbonyloxy group, and N-n-octylcarbamoyloxy group; alkoxycarbonyloxy groups, preferably substituted or unsubstituted alkoxycarbonyloxy groups having a carbon number of 2 to 30, such as a methoxycarbonyloxy group, ethoxycarbonyloxy group, tert-butoxycarbonyloxy group, and n-octylcarbonyloxy group; aryloxycarbonyloxy groups, preferably substituted or unsubstituted aryloxycarbonyloxy groups having a carbon number of 7 to 30, such as a phenoxycarbonyloxy group, p-methoxyphenoxycarbonyloxy group, and p-n-hexadecyloxyphenoxycarbonyloxy group; amino groups, preferably an amino group, substituted or unsubstituted alkylamino groups having a carbon number of 1 to 30, and substituted or unsubstituted anilino groups having a carbon number of 6 to 30, such as an amino group, methylamino group, dimethylamino group, anilino group, N-methylanilino group, and diphenylamino group; acylamino groups, preferably a formylamino group, substituted or unsubstituted alkylcarbonylamino groups having a carbon number of 1 to 30, and substituted or unsubstituted arylcarbonylamino groups having a carbon number of 6 to 30, such as a formylamino group, acetylamino group, pivaloylamino group, lauroylamino group, and benzoylamino group; aminocarbonylamino groups, preferably substituted or unsubstituted aminocarbonylamino groups having a carbon number of 1 to 30, such as a carbamoylamino group, N,N-dimethylaminocarbonylamino group, N,N-diethylaminocarbonylamino group, and morpholinocarbonylamino group; alkoxycarbonylamino groups, preferably substituted or unsubstituted alkoxycarbonylamino groups having a carbon number of 2 to 30, such as a methoxycarbonylamino group, ethoxycarbonylamino group, tert-butoxycarbonylamino group, n-octadecyloxycarbonylamino group, and N-methyl-methoxycarbonylamino group; aryloxycarbonylamino groups, preferably substituted or unsubstituted aryloxycarbonylamino groups having a carbon number of 7 to 30, such as a phenoxycarbonylamino group, p-chlorophenoxycarbonylamino group, and m-n-octyloxyphenoxycarbonylamino group; sulfamoylamino groups, preferably substituted or unsubstituted sulfamoylamino groups having a carbon number of 0 to 30, such as a sulfamoylamino group, N,N-dimethylaminosulfonylamino group, and N-n-octylaminosulfonylamino group; alkyl- or aryl-sulfonylamino groups, preferably substituted or unsubstituted alkylsulfonylamino groups having a carbon number of 1 to 30 and substituted or unsubstituted arylsulfonylamino groups having a carbon number of 6 to 30, such as a methylsulfonylamino group, butylsulfonylamino group, phenylsulfonylamino group, 2,3,5-trichlorophenylsulfonylamino group, and p-methylphenylsulfonylamino group; a mercapto group; alkylthio groups, preferably substituted or unsubstituted alkylthio groups having a carbon number of 1 to 30, such as a methylthio group, ethylthio group, and n-hexadecylthio group; arylthio groups, preferably substituted or unsubstituted arylthio groups having a carbon number of 6 to 30, such as a phenylthio group, p-chlorophenylthio group, and m-methoxyphenylthio group; heterocyclylthio groups, preferably substituted or unsubstituted heterocyclylthio group having a carbon number of 2 to 30, such as a 2-benzothiazolylthio group and 1-phenyltetrazole-5-yl thio group; sulfamoyl groups, preferably substituted or unsubstituted sulfamoyl groups having a carbon number of 0 to 30, such as an N-ethylsulfamoyl group, N-(3-dodecyloxypropyl)sulfamoyl group, N,N-dimethylsulfamoyl group, N-acetylsulfamoyl group, N-benzoylsulfamoyl group, and N-(N'-phenylcarbamoyl)sulfamoyl group; a sulfo group; alkyl- or aryl-sulfinyl groups, preferably substituted or unsubstituted alkylsulfinyl groups having a carbon number of 1 to 30 and substituted or unsubstituted arylsulfinyl groups having a carbon number of 6 to 30, such as a methylsulfinyl group, ethylsulfinyl group, phenylsulfinyl group, and p-methylphenylsulfinyl group; alkyl- or aryl-sulfonyl groups, preferably substituted or unsubstituted alkylsulfonyl groups having a carbon number of 1 to 30 and substituted or unsubstituted arylsulfonyl groups having a carbon number of 6 to 30, such as a methylsulfonyl group, ethylsulfonyl group, phenylsulfonyl group, and p-methylphenylsulfonyl group; acyl groups, preferably a formyl group, substituted or unsubstituted alkylcarbonyl groups having a carbon number of 2 to 30, substituted or unsubstituted arylcarbonyl groups having a carbon number of 7 to 30, such as an acetyl group and pivaloylbenzoyl group; aryloxycarbonyl groups, preferably substituted or unsubstituted aryloxycarbonyl groups having a carbon number of 7 to 30, such as a phenoxycarbonyl group, o-chlorophenoxycarbonyl group, m-nitrophenoxycarbonyl group, and p-tert-butylphenoxycarbonyl group; alkoxycarbonyl groups, preferably substituted or unsubstituted alkoxycarbonyl groups having a carbon number of 2 to 30, such as a methoxycarbonyl group, ethoxycarbonyl group, tert-butoxycarbonyl group, and n-octadecyloxycarbonyl group; carbamoyl groups, preferably substituted or unsubstituted carbamoyl groups having a carbon number of 1 to 30, such as a carbamoyl group, N-methylcarbamoyl group, N,N-dimethylcarbamoyl group, N,N-di-n-octylcarbamoyl group, and N-(methylsulfonyl)carbamoyl group; aryl- and heterocyclyl-azo groups, preferably substituted or unsubstituted arylazo groups having a carbon number of 6 to 30 and substituted or unsubstituted heterocyclylazo groups having a carbon number of 3 to 30, such as a phenylazo group, p-chlorophenylazo group, and 5-ethylthio-1,3,4-thiadiazole-2-yl azo group; imide groups, preferably an N-succinimido group and N-phthalimido group; phosphino groups, preferably substituted or unsubstituted phosphino groups having a carbon number of 2 to 30, such as a dimethylphosphino group, diphenylphosphino group, and methylphenoxyphosphino group; phosphinyl groups, preferably substituted or unsubstituted phosphinyl groups having a carbon number of 2 to 30, such as a phosphinyl group, dioctyloxyphosphinyl group, and diethoxyphosphinyl group; phosphinyloxy groups, preferably substituted or unsubstituted phosphinyloxy groups having a carbon number of 2 to 30, such as a diphenoxyphosphinyloxy group and dioctyloxyphosphinyloxy group; phosphinylamino groups, preferably substituted or unsubstituted phosphinylamino groups having a carbon number of 2 to 30, such as a dimethoxyphosphinylamino group and dimethylaminophosphinylamino group; and silyl groups, preferably substituted or unsubstituted silyl groups having a carbon number of 3 to 30, such as a trimethylsilyl group, tert-butyldimethylsilyl group, and phenyldimethylsilyl group.

In the above substituents having a hydrogen atom, the hydrogen atom may be removed and further replaced by the above substituent. Examples of such functional groups include alkylcarbonylaminosulfonyl groups, arylcarbonylaminosulfonyl groups, alkylsulfonylaminocarbonyl groups, and arylsulfonylaminocarbonyl groups, and specific examples thereof include a methylsulfonylaminocarbonyl group, p-methylphenylsulfonylaminocarbonyl group, acetylaminosulfonyl group, and benzoylaminosulfonyl group.

Further, when a compound has two or more substituents, the substituents may be the same or different ones, and may be connected to each other to form a ring if possible.

The compound represented by the formula (6-A) or (6-B) is preferably such that $R^{11}$'s are methyl groups, $R^{2}$'s and $R^{5}$'s are hydrogen atoms, $R^{13}$ is an alkyl group having 3 or more carbon atoms, $L^1$ is a single bond, —O—, —CO—, —NR—, —SO$_2$NR—, —NRSO$_2$—, —CONR—, —NRCO—, —COO—, —OCO—, or an alkynylene group (in which R is a hydrogen atom, or an alkyl or aryl group that may have a substituent, preferably a hydrogen atom), $L^{21}$ is —O— or —NR—, $Ar^1$ is an arylene group, and n is 3 to 6.

The compounds represented by the formulae (1) are illustrated in detail below with reference to specific examples without intention of restricting the scope of the invention.

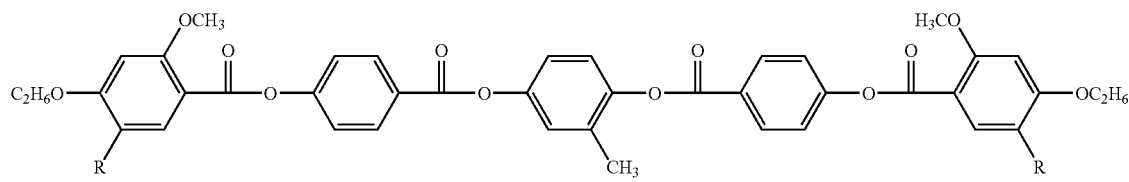

A-1; R = H
B-1; R = OCH$_3$

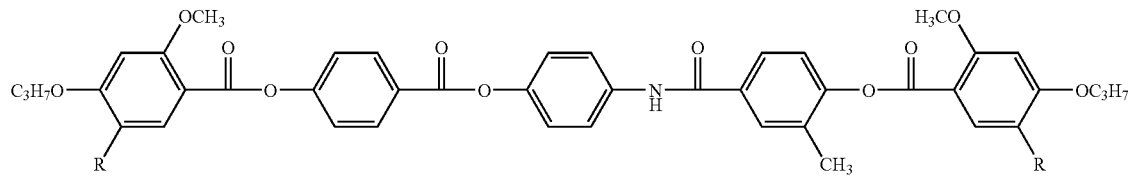

A-2; R = H
B-2; R = OCH$_3$

-continued
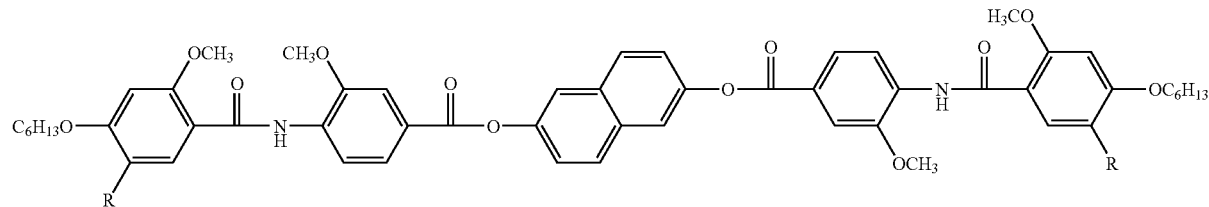
A-3; R = H
B-3; R = OCH₃
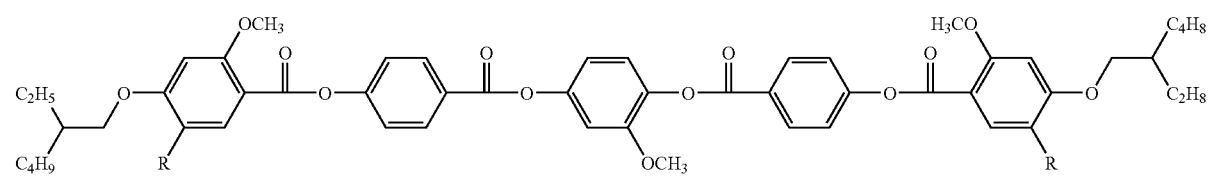
A-4; R = H
B-4; R = OCH₃
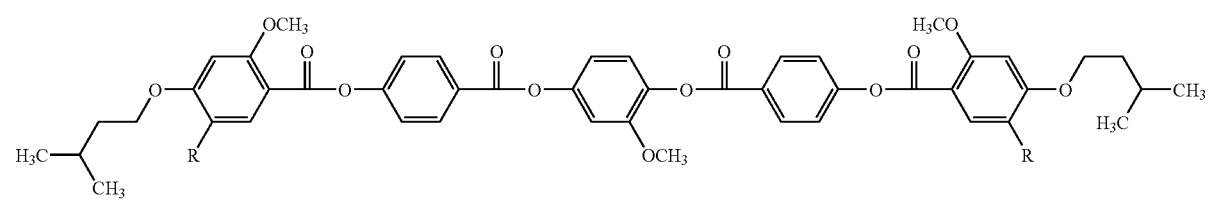
A-5; R = H
B-5; R = OCH₃
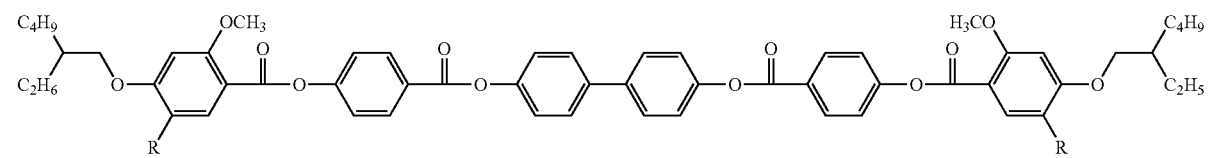
A-6; R = H
B-6; R = OCH₃
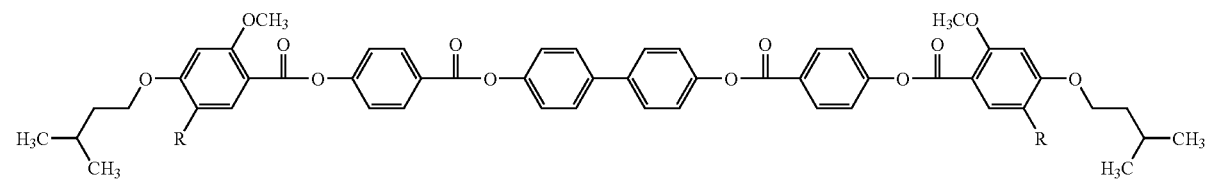
A-7; R = H
B-7; R = OCH₃
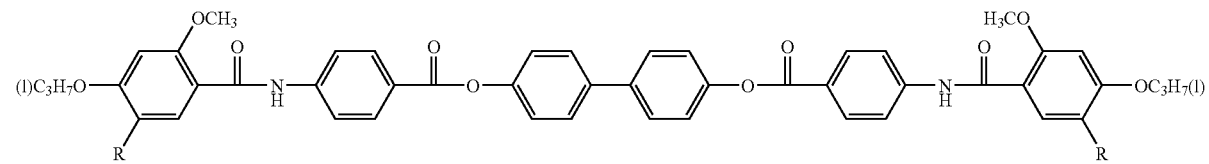
A-8; R = H
B-8; R = OCH₃

-continued
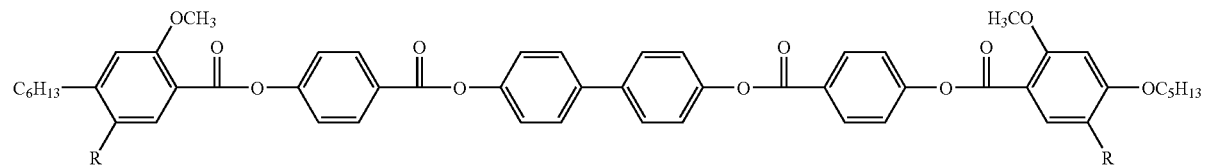
A-9; R = H
B-9; R = OCH₃
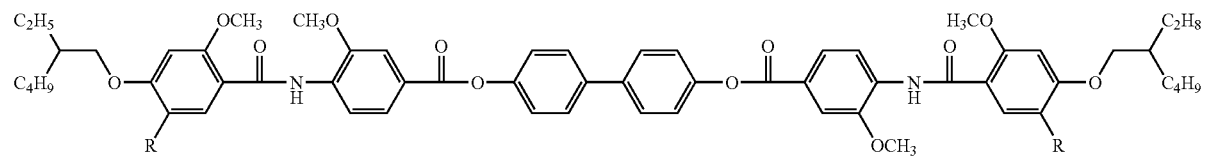
A-10; R = H
B-10; R = OCH₃
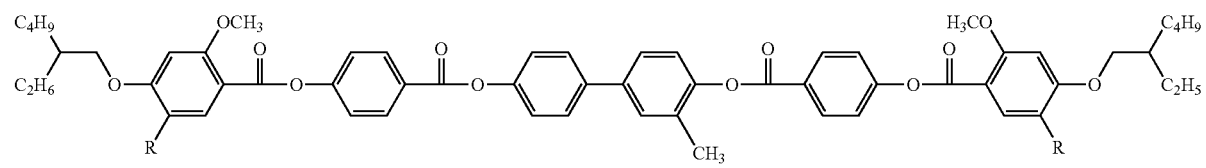
A-11; R = H
B-11; R = OCH₃
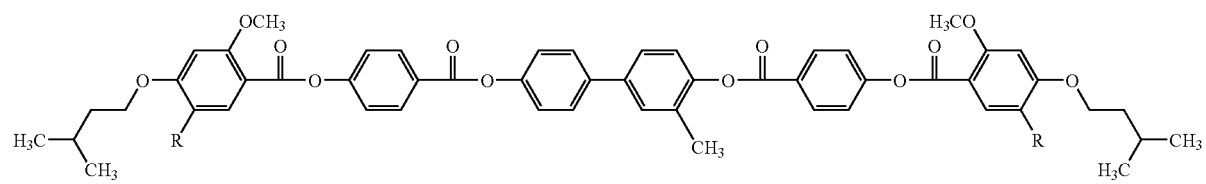
A-12; R = H
B-12; R = OCH₃
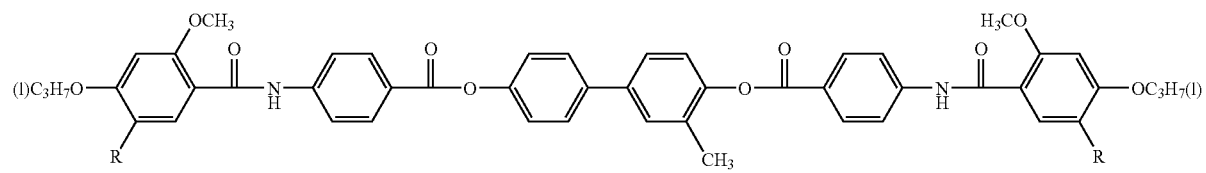
A-13; R = H
B-13; R = OCH₃
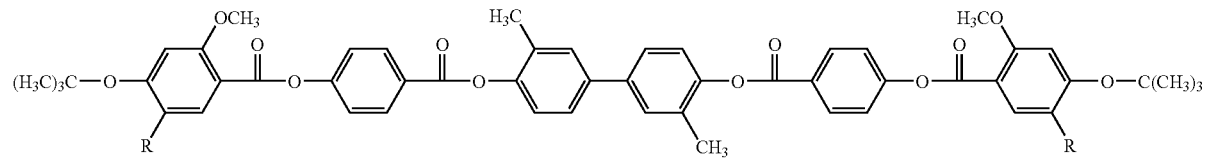
A-14; R = H
B-14; R = OCH₃

-continued
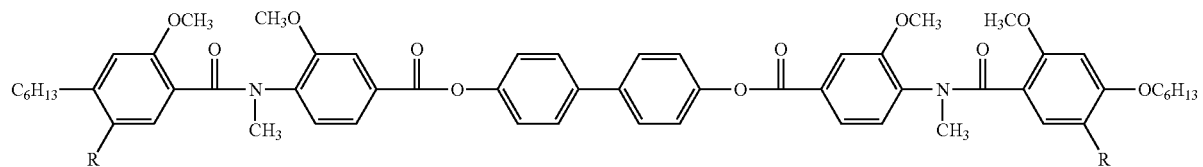
A-15; R = H
B-15; R = OCH$_3$
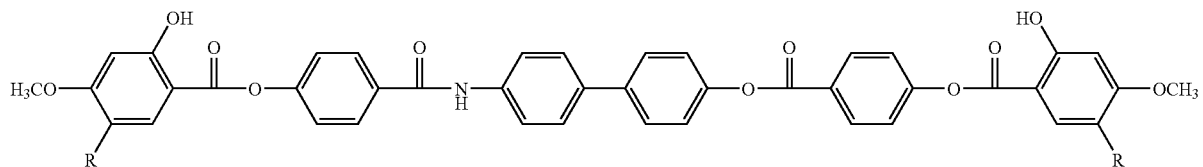
A-16; R = H
B-16; R = OCH$_3$
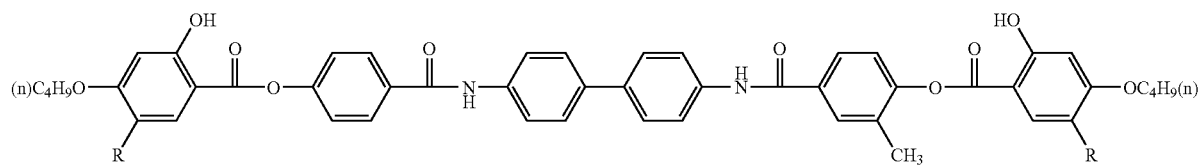
A-17; R = H
B-17; R = OCH$_3$
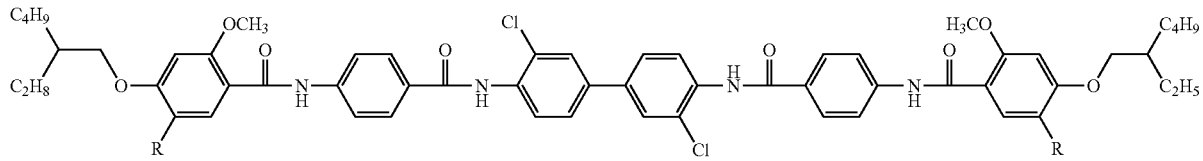
A-18; R = H
B-18; R = OCH$_3$
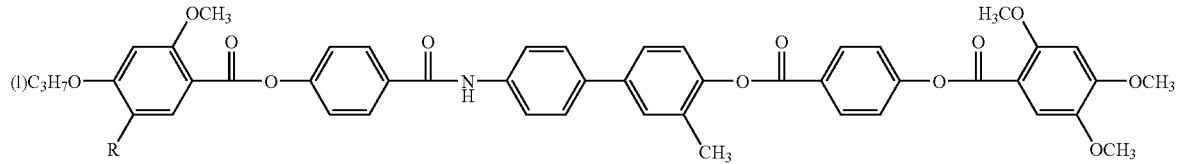
A-19; R = H
B-19; R = OCH$_3$
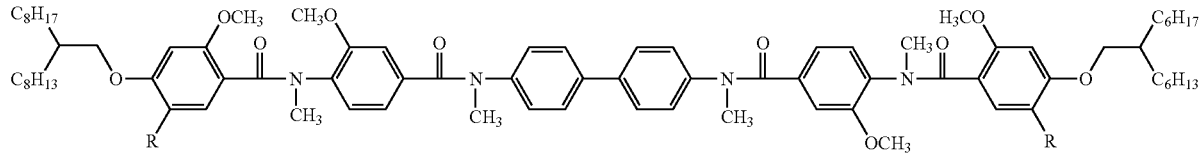
A-20; R = H
B-20; R = OCH$_3$ -continued
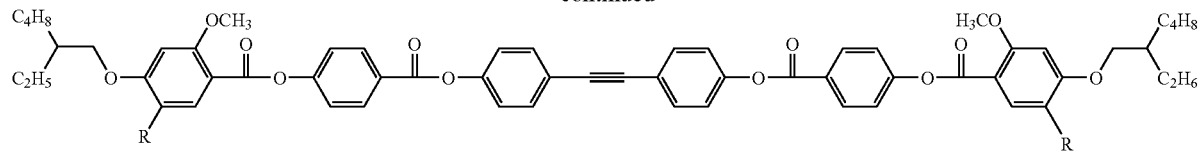
A-21; R = H
B-21; R = OCH₃
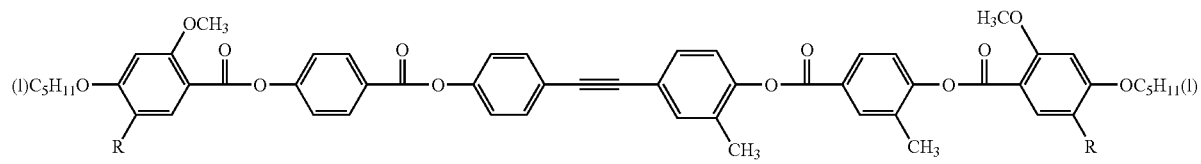
A-22; R = H
B-22; R = OCH₃
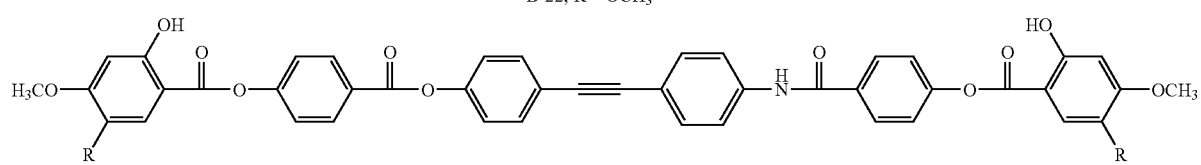
A-23; R = H
B-23; R = OCH₃
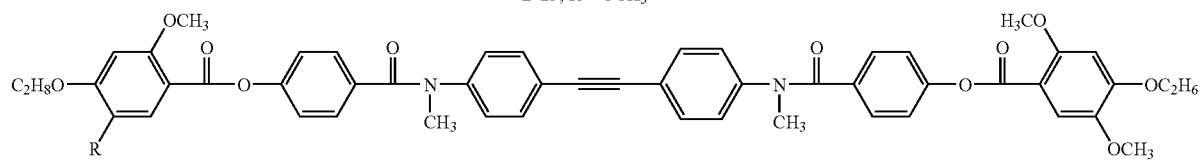
A-24; R = H
B-24; R = OCH₃
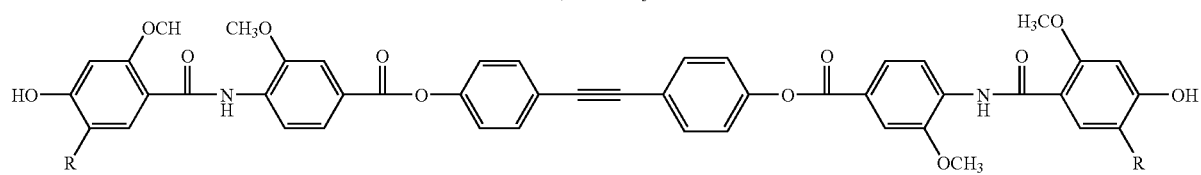
A-25; R = H
B-25; R = OCH₃
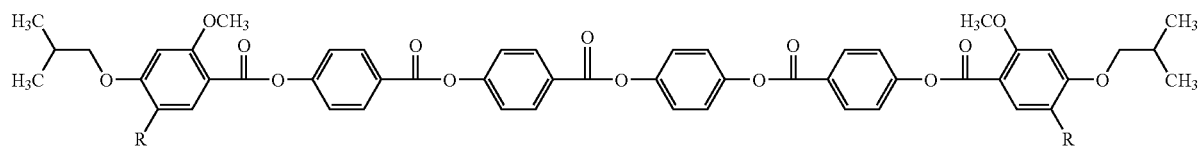
A-26; R = H
B-26; R = OCH₃
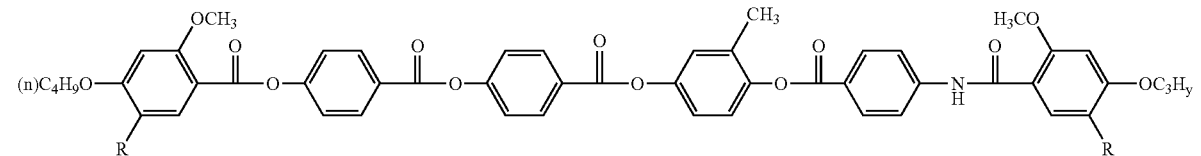
A-27; R = H
B-27; R = OCH₃

-continued
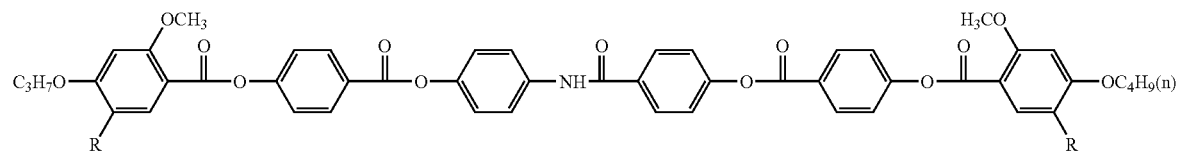
A-28; R = H
B-28; R = OCH₃
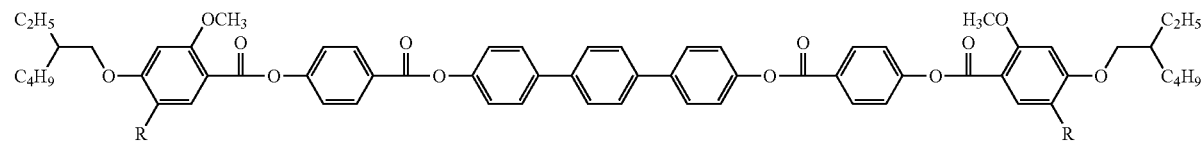
A-29; R = H
B-29; R = OCH₃
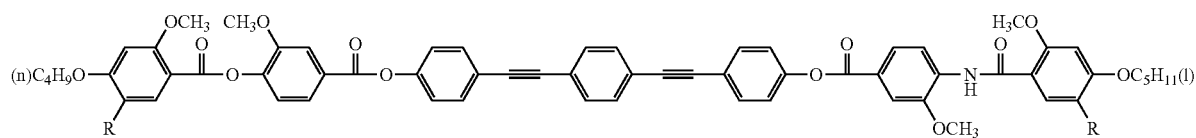
A-30; R = H
B-30; R = OCH₃
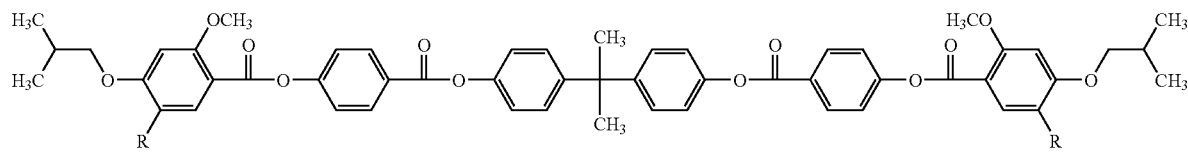
A-31; R = H
B-31; R = OCH₃
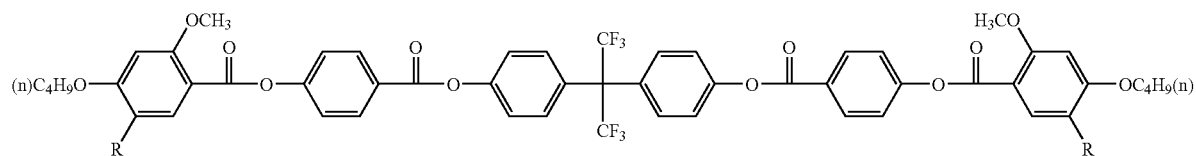
A-32; R = H
B-32; R = OCH₃
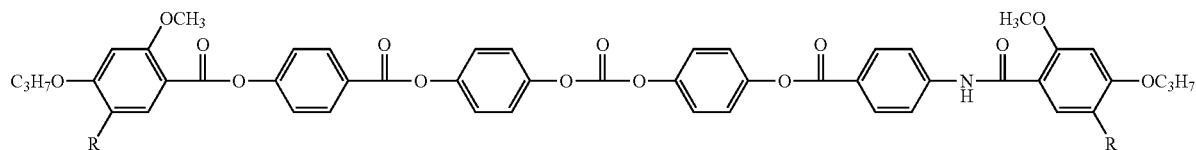
A-33; R = H
B-33; R = OCH₃
C-1
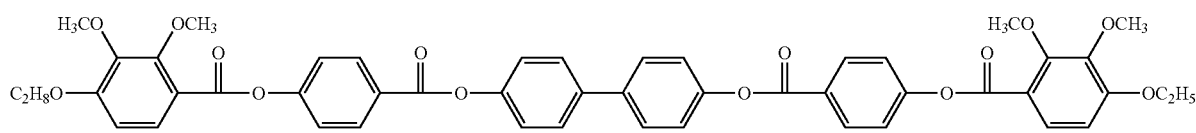

-continued

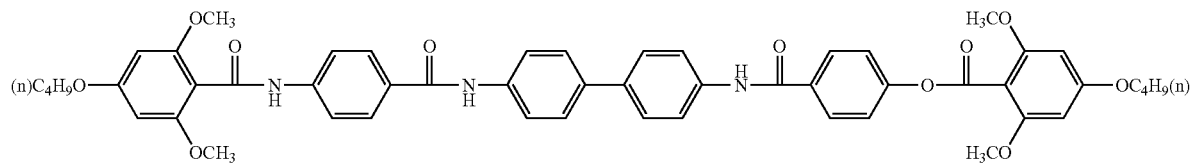
C-2

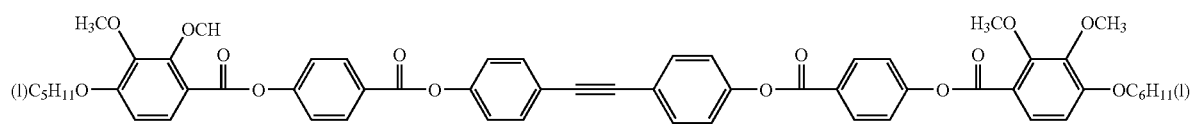
C-3

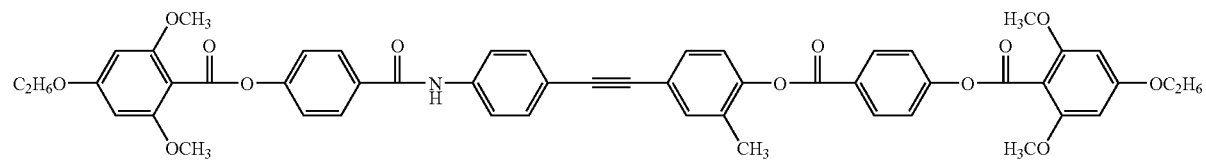
C-4

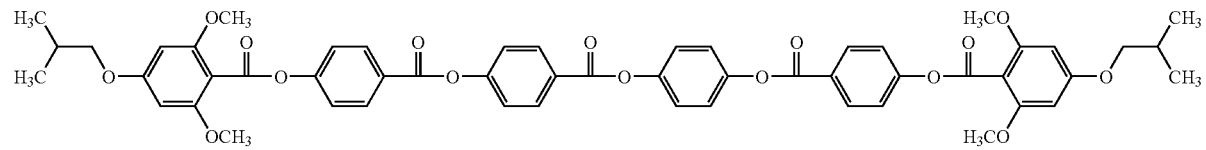
C-5

The compound represented by the formula (1) can be synthesized by preparing a substituted benzoic acid and by carrying out a common esterification or amidation reaction between the substituted benzoic acid and a phenol or aniline derivative. The reaction may be any one as long as it can generate an ester or amide bond. Examples of the reaction methods include methods containing converting the substituted benzoic acid to an acyl halide and condensing the acyl halide with the phenol or aniline derivative, and methods containing dehydration condensation of the substituted benzoic acid and the phenol or aniline derivative using a condensing agent or a catalyst.

It is preferred that the compound represented by the formula (1) is produced by the method containing converting the substituted benzoic acid to the acyl halide and condensing the acyl halide with the phenol or aniline derivative from the viewpoint of the production process.

A reaction solvent may be selected from hydrocarbon solvents (preferably toluene and xylene), ether solvents (preferably dimethyl ether, tetrahydrofuran, and dioxane), ketone solvents, ester solvents, acetonitrile, dimethylformamide, and dimethylacetamide. These solvents may be used singly or as a mixed solvent thereof. The solvent is preferably toluene, acetonitrile, dimethylformamide, and dimethylacetamide.

The reaction temperature is preferably 0 to 150° C., more preferably 0 to 100° C., further preferably 0 to 90° C., particularly preferably 20 to 90° C.

It is preferred that a base is not used in the reaction. In the case of using a base, it may be an organic or inorganic base, preferably an organic base, and examples thereof include pyridine and tertiary alkylamine (preferably triethylamine and ethyldiisopropyl amine).

The compounds represented by the formulae (6-A) and (6-B) can be synthesized by known methods. For example, when n is 4, the compounds may be obtained by reacting a starting material having the following structure A with a derivative having a reactive moiety such as a hydroxyl group or an amino group, and by connecting 2 molecules of thus-obtained following intermediate B by 1 molecule of the following compound C. It should be noted that the methods for synthesizing the compounds represented by formulae (6-A) and (6-B) are not limiter to this example.

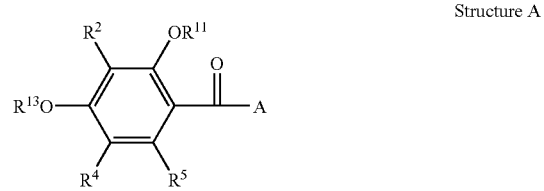
Structure A wherein A represents a reactive moiety such as a hydroxyl group and a halogen atom, $R^2$ and $R^5$ each represent a hydrogen atom or a substituent, $R^{11}$ and $R^{13}$ each represent a hydrogen atom or an alkyl group, and $R^4$ represents a hydrogen atom, —OH or an alkoxy group.

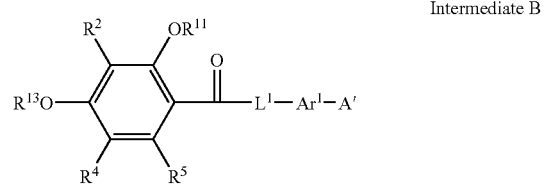
Intermediate B wherein A' represents a reactive group such as a carboxyl group, $Ar^1$ represents an arylene group or a divalent aromatic heterocycle, $L^1$ represents a single bond or a divalent linking group, $R^2$ and $R^5$ each represent a hydrogen atom or a substituent, $R^{11}$ and $R^{13}$ each represent a hydrogen atom or an alkyl group, and $R^4$ represents a hydrogen atom, —OH or an alkoxy group.

Compound C

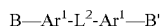

wherein B and B' each represent a reactive moiety such as a hydroxyl group and an amino group, $Ar^1$ represents an arylene group or a divalent aromatic heterocycle, and $L^2$ represents a single bond or a divalent linking group.

The compound represented by the formula (1) can be particularly preferably used as a retarder for forming a stretched film excellent in Re forming properties.

The compound represented by the formula (1) (the retarder) used in the invention may be used singly or as a mixture of two or more. The weight ratio of the retarder to the cellulose acylate is preferably 0.01 to 30% by weight, more preferably 0.1 to 20% by weight, further preferably 1 to 5% by weight.

The retarder may be dissolved in an organic solvent such as an alcohol (e.g. methanol), methylene chloride, or dioxolane and then added to a cellulose acylate solution (a dope), or alternatively may be added directly to a dope composition.

(Hydrophobizing Agent)

Next the hydrophobizing agent (the compound having a hydrogen-donating group capable of forming a hydrogen bond and an aromatic ring) is described below. The hydrophobizing agent having a hydrogen-donating group capable of forming a hydrogen bond and an aromatic ring is used in the invention, so that the hydrophobizing agent is effectively fixed to the cellulose acylate molecule chain by a hydrogen bond due to the hydrogen-donating group capable of forming a hydrogen bond, and interaction between water molecules and the cellulose acylate molecule chain is reduced due to the hydrophobicity of the aromatic ring.

The hydrogen-donating group capable of forming a hydrogen bond has a hydrogen atom, and is such a functional group that a hydrogen bond can be formed between the hydrogen atom and another highly electronegative functional group. The hydrogen-donating group capable of forming a hydrogen bond is preferably an amino group, an acylamino group, an alkoxycarbonylamino group, an aryloxycarbonylamino group, a sulfonylamino group, a hydroxyl group, a mercapto group, or a carboxyl group, particularly preferably a hydroxyl group, an acylamino group, or a sulfonylamino group.

In the invention, the number of the aromatic ring in the hydrophobizing agent is not particularly limited, and is preferably 1 to 10, more preferably 2 to 8, further preferably 3 to 6. When the number of the aromatic ring is within the range, more effective hydrophobizing effect and compatibility between the hydrophobizing agent and the cellulose acylate can be achieved.

The hydrogen-donating group capable of forming a hydrogen bond may be connected to the aromatic ring directly or by an atom such as a carbon atom.

A compound represented by the following formula (2) can be particularly preferably used as the hydrophobizing agent in the invention.

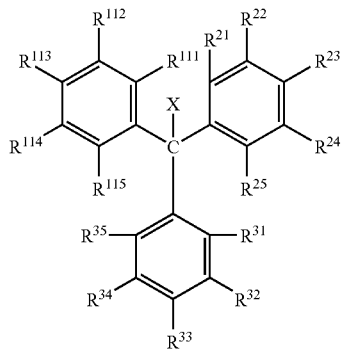

Formula (II)

In the formula (2), X represents a substituted or unsubstituted amino group, a substituted or unsubstituted acylamino group, a substituted or unsubstituted alkoxycarbonylamino group, a substituted or unsubstituted aryloxycarbonylamino group, a substituted or unsubstituted sulfonylamino group, a hydroxyl group, a mercapto group, or a carboxyl group. $R^{111}$, $R^{112}$, $R^{113}$, $R^{114}$, $R^{115}$, $R^{21}$, $R^{22}$, $R^{23}$, $R^{24}$, $R^{25}$, $R^{31}$, $R^{32}$, $R^{33}$, $R^{34}$, and $R^{35}$ each represent a hydrogen atom or a substituent.

X is preferably a substituted or unsubstituted acylamino group, a substituted or unsubstituted sulfonylamino group, or a hydroxyl group, more preferably a substituted or unsubstituted amino group or a hydroxyl group, particularly preferably a hydroxyl group.

$R^{111}$, $R^{112}$, $R^{113}$, $R^{114}$, $R^{115}$, $R^{21}$, $R^{22}$, $R^{23}$, $R^{24}$, $R^{25}$, $R^{31}$, $R^{32}$, $R^{33}$, $R^{34}$, and $R^{35}$ each represent a hydrogen atom or a substituent, which may be the following substituent $T^2$.

Examples of the substituents $T^2$ include alkyl groups, the carbon number thereof being preferably 1 to 20, more preferably 1 to 12, further preferably 1 to 8, such as a methyl group, ethyl group, isopropyl group, tert-butyl group, n-octyl group, n-decyl group, n-hexadecyl group, cyclopropyl group, cyclopentyl group, and cyclohexyl group; alkenyl groups, the carbon number thereof being preferably 2 to 20, more preferably 2 to 12, further preferably 2 to 8, such as a vinyl group, allyl group, 2-butenyl group, and 3-pentenyl group; alkynyl groups, the carbon number thereof being preferably 2 to 20, more preferably 2 to 12, further preferably 2 to 8, such as a propargyl group and 3-pentynyl group; aryl groups, the carbon number thereof being preferably 6 to 30, more preferably 6 to 20, particularly preferably 6 to 12, such as a phenyl group, p-methylphenyl group, and naphtyl group; substituted or unsubstituted amino groups, the carbon number thereof being preferably 0 to 20, more preferably 0 to 10, further preferably 0 to 6, such as an amino group, methylamino group, dimethylamino group, diethylamino group, and dibenzylamino group; alkoxy groups, the carbon number thereof being preferably 1 to 20, more preferably 1 to 12, further preferably 1 to 8, such as a methoxy group, ethoxy group, and butoxy group; aryloxy groups, the carbon number thereof being preferably 6 to 20, more preferably 6 to 16, further preferably 6 to 12, such as a phenyloxy group and 2-naphtyloxy group; acyl groups, the carbon number thereof being preferably 1 to 20, more preferably 1 to 16, further preferably 1 to 12, such as an acetyl group, benzoyl group, formyl group, and pivaloyl group; alkoxycarbonyl groups, the carbon number thereof being preferably 2 to 20, more preferably 2 to 16, further preferably 2 to 12, such as a methoxycarbonyl group and ethoxycarbonyl group; aryloxycarbonyl groups, the carbon number thereof being preferably 7 to 20, more preferably 7 to 16, further preferably 7 to 10, such as a phenyloxycarbonyl group; acyloxy groups, the carbon number thereof being preferably 2 to 20, more preferably 2 to 16, further preferably 2 to 10, such as an acetoxy group and benzoyloxy group; acylamino groups, the carbon number thereof being preferably 2 to 20, more preferably 2 to 16, further preferably 2 to 10, such, as an acetylamino group and benzoylamino group; alkoxycarbonylamino groups, the carbon number thereof being preferably 2 to 20, more preferably 2 to 16, further preferably 2 to 12, such as a methoxycarbonylamino group; aryloxycarbonylamino groups, the carbon number thereof being preferably 7 to 20, more preferably 7 to 16, further preferably 7 to 12, such as a phenyloxycarbonylamino group; sulfonylamino groups, the carbon number thereof being preferably 1 to 20, more preferably 1 to 16, particularly preferably 1 to 12, such as a methanesulfonylamino group and benzenesulfonylamino group; sulfamoyl groups, the carbon number thereof being preferably 0 to 20, more preferably 0 to 16, further preferably 0 to 12, such as a sulfamoyl group, methylsulfamoyl group, dimethylsulfamoyl group, and phenylsulfamoyl group; carbamoyl groups, the carbon number thereof being preferably 1 to 20, more preferably 1 to 16, particularly preferably 1 to 12, such as a carbamoyl group, methylcarbamoyl group, diethylcarbamoyl group, and phenylcarbamoyl group; alkylthio groups, the carbon number thereof being preferably 1 to 20, more preferably 1 to 16, further preferably 1 to 12, such as a methylthio group and ethylthio group; arylthio groups, the carbon number thereof being preferably 6 to 20, more preferably 6 to 16, further preferably 6 to 12, such as a phenylthio group; sulfonyl groups, the carbon number thereof being preferably 1 to 20, more preferably 1 to 16, further preferably 1 to 12, such as a mesyl group and tosyl group; sulfinyl groups, the carbon number thereof being preferably 1 to 20, more preferably 1 to 16, further preferably 1 to 12, such as a methanesulfinyl group and benzenesulfinyl group; ureido groups, the carbon number thereof being preferably 1 to 20, more preferably 1 to 16, further preferably 1 to 12, such as a ureido group, methylureido group, and phenylureido group; phosphoric amide groups, the carbon number thereof being preferably 1 to 20, more preferably 1 to 16, further preferably 1 to 12, such as a diethylphosphoric amide group and phenylphosphoric amide group; a hydroxyl group; a mercapto group; halogen atoms such as a fluorine atom, chlorine atom, bromine atom, and iodine atom; a cyano group; a sulfo group; a carboxyl group; a nitro group; a hydroxamic acid group; a sulfino group; a hydrazino group; an imino group; heterocyclic groups having a heteroatom of a nitrogen atom, oxygen atom, sulfur atom, etc., the carbon number thereof being preferably 1 to 30, more preferably 1 to 12, such as an imidazolyl group, pyridyl group, quinolyl group, furyl group, piperidyl group, morpholino group, benzoxazolyl group, benzimidazolyl group, and benzthiazolyl group; and silyl groups, the carbon number thereof being preferably 3 to 40, more preferably 3 to 30, further preferably 3 to 24, such as a trimethylsilyl group and triphenylsilyl group. Among them, more preferred are alkyl groups, aryl groups, amino groups, alkoxy groups, and aryloxy groups, further preferred are alkyl groups, aryl groups, and alkoxy groups.

These substituents $T^2$ may have a further substituent $T^2$ When the compound has two or more substituents, the substituents may be the same or different ones. The substituents $T^2$ (or substituents having the substituents $T^2$) may be connected and may form a ring if possible.

Specific examples of the compounds represented by the formula (2) are illustrated below without intention of restricting the scope of the invention.

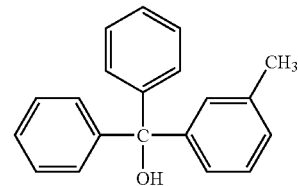

C-1

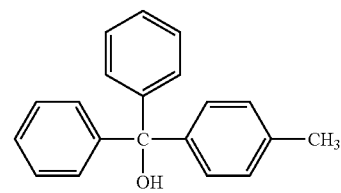

C-2

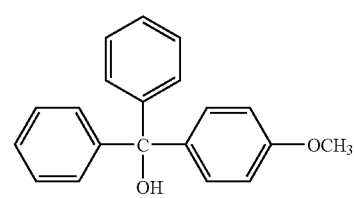

C-3

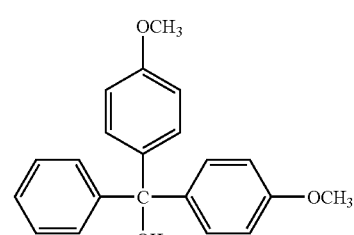

C-4

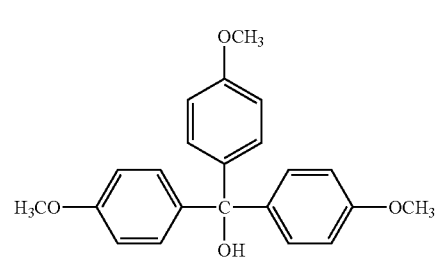

C-5

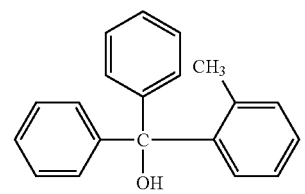

C-6

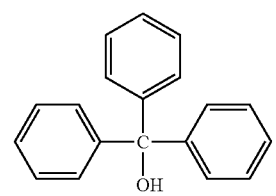

C-7

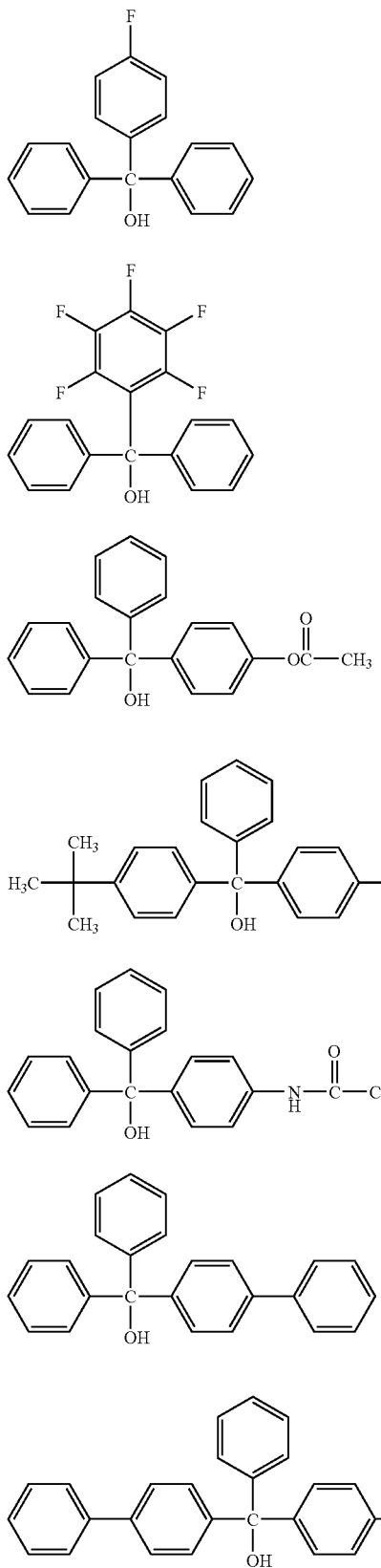

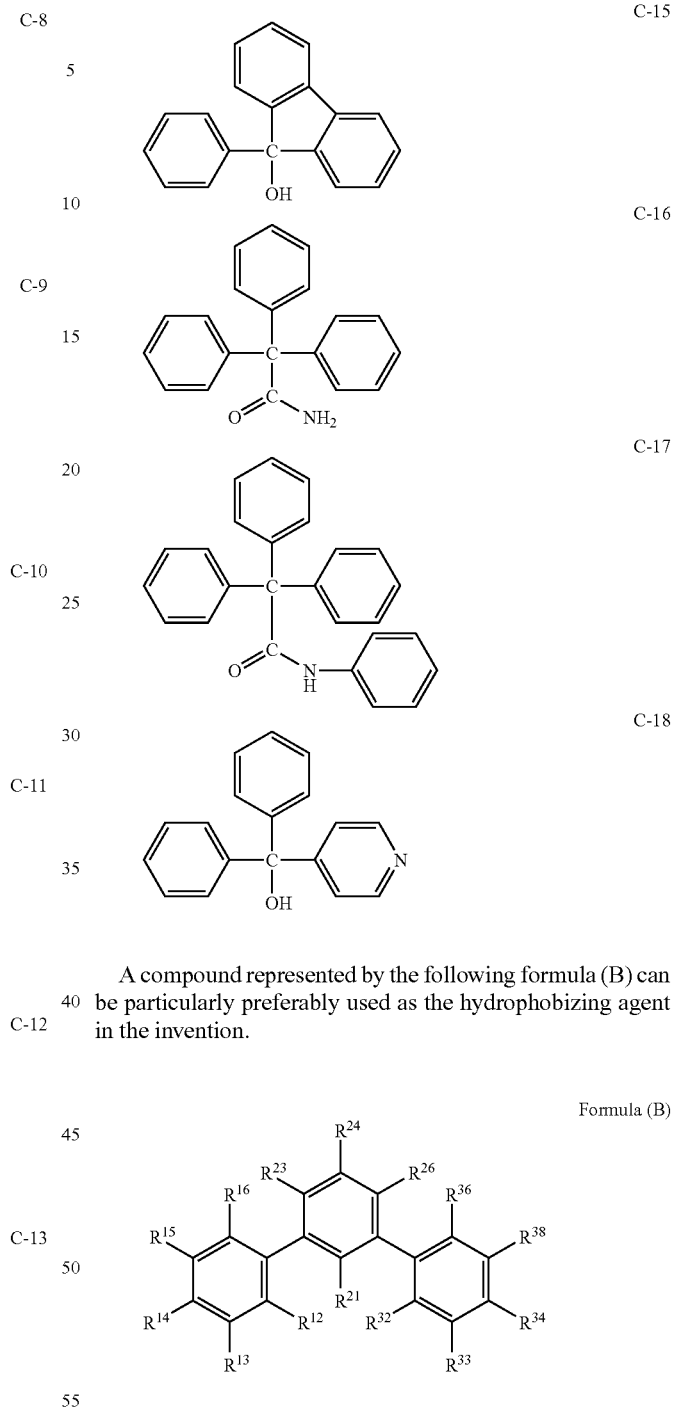

A compound represented by the following formula (B) can be particularly preferably used as the hydrophobizing agent in the invention.

wherein $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$ and $R^{36}$ represent a hydrogen atom or a substituent, which may be the above substituent $T^2$. At least one of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$ and $R^{36}$ is an amino group, an acylamino group, an alkoxycarbonylamino group, an aryloxycarbonylamino group, a sulfonylamino group, a hydroxyl group, a mercapto group or a carboxyl group, more preferably an amino group or a hydroxyl group, particularly preferably a hydroxyl group. These groups may be substituted with a group, which may be the above sustituent $T^2$.

Specific examples of the compounds represented by the formula (B) are illustrated below without intention of restricting the scope of the invention.

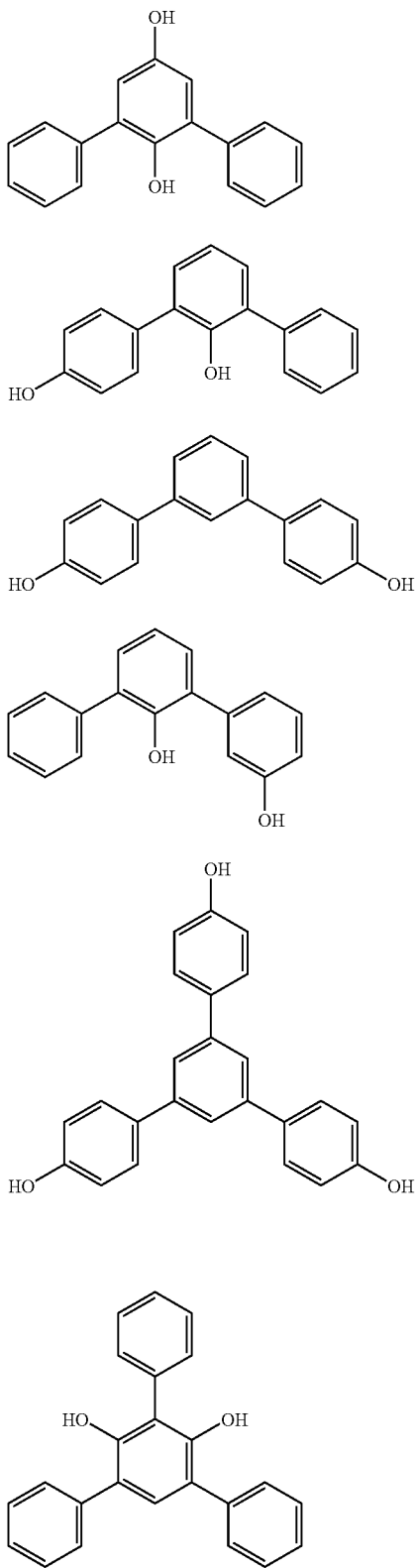

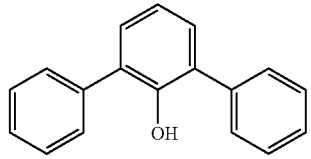

The molecular weight of the hydrophobizing agent used in the invention is preferably 250 to 2,000, more preferably 250 to 1,000. The boiling point of the hydrophobizing agent is preferably 260° C. or higher. The boiling point can be measured by commercially available measuring apparatus such as TG/DTA100 available from Seiko Instruments & Electronics Ltd.

The hydrophobizing agent used in the invention may be dissolved in an organic solvent such as an alcohol (e.g. methanol), methylene chloride, or dioxolane and then added to a cellulose acetate solution (a dope), or alternatively may be added directly to a dope composition.

The weight ratio of the hydrophobizing agent to the cellulose acylate is preferably 1 to 30% by weight, more preferably 2 to 30% by weight, further preferably 3 to 25% by weight, most preferably 5% to 20% by weight.

Further, the weight ratio of the hydrophobizing agent to the retarder is preferably 0.5 to 30, more preferably 1 to 20, most preferably 2 to 15.

(Cellulose Acylate)

The material of the cellulose acylate for the cellulose acylate film of the invention may be a known one (*Kokai Giho* (*JIII Journal of Technical Disclosure*), No. 2001-1745, published in Mar. 15, 2001, Japan Institute of Invention and Innovation, Page 15, etc.) Further, the cellulose acylate may be synthesized by a known method (Migita, et al., *Mokuzai Kagaku*, Page 180 to 190 (Kyoritsu Shuppan Co., Ltd., 1968), etc.) The viscosity average polymerization degree of the cellulose acylate is preferably 200 to 700, more preferably 250 to 500, further preferably 250 to 350. It is preferred that the cellulose ester has a narrow molecular weight distribution of Mw/Mn measured by a gel permeation chromatography, in which Mw is a weight average molecular weight and Mn is a number average molecular weight. Specifically, the value of Mw/Mn is preferably 1.5 to 5.0, further preferably 2.0 to 4.5, most preferably 3.0 to 4.0.

An acyl group of the cellulose acylate used in the invention is not particularly limited, and is preferably an acetyl group, a propionyl group, or a butyryl group, more preferably an acetyl group. The substitution degree of the acyl group (the total acylation degree) is preferably 1.5 to 3.0, more preferably 2.5 to 2.95, further preferably 2.70 to 2.90. In this invention, the substitution degree of the acyl group (the total acylation degree) is a value calculated in accordance with ASTM D817.

The acyl group is most preferably an acetyl group, and in a case where the cellulose acetate has an acetyl group as the acyl group, the acetylation degree is preferably 59.0 to 62.5%, further preferably 60.7 to 61.5%. When the acetylation degree is within the above range, Re increase over the desired value by transport tension can be effectively prevented in a casting process, the surface unevenness can be reduced, and the retardation change due to temperature and humidity can be reduced.

It is preferred that the acyl substitution degree at the 6-position is 0.9 or more from the viewpoint of preventing unevenness of the Re and Rth.

In a film containing a cellulose acylate prepared by connecting an acyl group having 2 or more carbon atoms to hydroxyl groups of a cellulose, when DS2 represents an acyl substitution degree at 2-positions, DS3 represents an acyl substitution degree at 3-positions, and DS6 represents an acyl substitution degree at 6-position, they preferably satisfies the following inequalities (III) and (IV).

$$2.0 \leq DS2+DS3+DS6 \leq 3.0 \quad \text{(III)}$$

$$0.310 \leq DS6/(DS2+DS3+DS6) \quad \text{(IV)}$$

Further, it is preferred that the cellulose acylate is prepared by connecting an acetyl group and an acyl group having 3 to 22 carbon atoms to hydroxyl groups of a cellulose, and the cellulose acylate has the acetyl substitution degree A and the substitution degree B of the acyl group having 3 to 22 carbon atoms satisfying the following inequalities (V) and (W).

$$2.70 \leq A+B \leq 3.0 \quad \text{(V)}$$

$$0 \leq B \leq 1.5 \quad \text{(W)}$$

(Production of Cellulose Acylate Film)

In the invention, the cellulose acylate film is preferably produced by a solution casting method. In the solution casting method, a solution (a dope) prepared by dissolving the cellulose acylate in an organic solvent to produce the film.

The organic solvent for forming the film preferably contains a solvent selected from the group consisting of ethers having 3 to 12 carbon atoms, ketones having 3 to 12 carbon atoms, esters having 3 to 12 carbon atoms, and halogenated hydrocarbons having 1 to 6 carbon atoms. The ethers, ketones, and esters may have a cyclic structure. A compound having two or more groups selected from ether, ketone, and ester functional groups (—O—, —CO—, and —COO—) can be used as the organic solvent for forming the film. The organic solvent for forming the film may have another functional group such as an alcoholic hydroxyl group. The carbon number of the organic solvent having 2 or more types of functional groups may be within the carbon number range of a compound having any one of the functional groups.

Examples of the ethers having 3 to 12 carbon atoms include diisopropyl ether, dimethoxymethane, dimethoxyethane, 1,4-dioxane, 1,3-dioxolane, tetrahydrofuran, anisole, and phenetole.

Examples of the ketones having 3 to 12 carbon atoms include acetone, methyl ethyl ketone, diethyl ketone, diisobutyl ketone, cyclohexanone and methyl cyclohexanone.

Examples of the esters having 3 to 12 carbon atoms include ethyl formate, propyl formate, pentyl formate, methyl acetate, ethyl acetate, and pentyl acetate.

Examples of the organic solvents having the two or more types of functional groups include 2-ethoxyethyl acetate, 2-methoxyethanol, and 2-butoxyethanol.

The carbon number of the halogenated hydrocarbon is preferably 1 or 2, more preferably 1. A halogen atom of the halogenated hydrocarbon is preferably a chlorine atom. In the halogenated hydrocarbon, the ratio of hydrogen atoms replaced by halogen atoms is preferably 25 to 75 mol %, more preferably 30 to 70 mol %, further preferably 35 to 65 mol %, most preferably 40 to 60 mol %. A typical halogenated hydrocarbon is methylene chloride.

2 or more types of the organic solvents may be used as a mixture.

The cellulose acylate solution may be prepared by a common method. In the common method, the preparation is carried out at 0° C. or higher (at an ordinary temperature or a high temperature). The solution may be prepared by dope preparation method and apparatus for a common solution casting method. In the common method, the organic solvent is preferably a halogenated hydrocarbon, particularly methylene chloride.

The amount of the cellulose acylate is controlled such that the resulting solution has a cellulose acylate content of 10 to 40% by mass. The cellulose acylate content is further preferably 10 to 30% by mass. Additives to be hereinafter described may be added to the organic solvent (the main solvent).

The solution can be prepared by stirring the cellulose acylate and organic solvent at an ordinary temperature (0 to 40° C.). In the case of preparing a solution having a high concentration, they may be stirred under pressure and heat. Specifically the cellulose acylate and the organic solvent are put in a pressurized vessel and closed, and are then stirred under increased pressure while heating at a temperature higher than the boiling point of the solvent without boiling the solvent. The heating temperature may be 40° C. or higher, preferably 60 to 200° C., further preferably 80 to 110° C.

The components may be roughly premixed and then put in a vessel. The components may be separately added to the vessel. The vessel preferably has such a structure that the components can be stirred. The inner pressure of the vessel may be increased by introducing an inert gas such as nitrogen gas. Alternatively the inner pressure may be increased by heating to increase the solvent vapor pressure. The components may be added under the increased pressure after the vessel is closed.

In the case of using the heating process, the vessel is preferably heated from the outside. For example, the vessel may be heated by a jacket type heating apparatus. Further, the entire vessel may be heated such that a plate heater is placed on the outside of the vessel, a pipe is connected thereto, and a liquid is circulated in the pipe.

The components are preferably stirred by an impeller formed in the vessel. The impeller preferably has such a length that it reaches the vicinity of the vessel wall. A scrape blade is preferably formed on the end of the impeller to interchange the liquid on the vessel wall.

The vessel may contain a measuring instrument such as a pressure indicator or a thermometer. Each component is dissolved in the solvent in the vessel. The prepared dope is isolated from the vessel after cooling, or is isolated and then cooled by a heat exchanger, etc.

The solution may be prepared by a cooling dissolution method. By the cooling dissolution method, the cellulose acylate can be dissolved even in an organic solvent, in which it is hardly dissolved by a common method. In the case of using a solvent in which the cellulose acylate can be dissolved by a common method, a uniform solution can be rapidly obtained by the cooling dissolution method.

In the cooling dissolution method, first the cellulose acylate is gently added to the organic solvent while stirring at room temperature.

The amount of the cellulose acylate is preferably controlled such that the cellulose acylate content of the mixture is 10 to 40% by mass. The cellulose acylate content is more preferably 10 to 30% by mass. Further, additives to be hereinafter described may be added to the mixture.

Then the mixture is cooled to a temperature of −100 to −10° C., etc., the temperature being preferably −80 to −10° C., further preferably −50 to −20° C., most preferably −50 to −30° C. The mixture may be cooled in dry ice-methanol bath (−75° C.), a cooled diethylene glycol solution (−30 to −20° C.), etc. In the cooling step, the mixture of the cellulose acylate and the organic solvent is solidified.

The cooling rate is preferably 4° C./minute or more, further preferably 8° C./minute or more, most preferably 12° C./minute or more. A higher cooling rate is more preferred, and the upper limit is theoretically 10,000° C./second, technically 1,000° C./second, and practically 100° C./second. The cooling rate is a value obtained by dividing the temperature difference between the start and end of the cooling by the time required for completing the cooling.

The resulting mixture is heated to a temperature of 0 to 200° C., etc., the temperature being preferably 0 to 150° C., further preferably 0 to 120° C., most preferably 0 to 50° C., so that the cellulose acetate is dissolved in the organic solvent. The mixture may be heated by only leaving at room temperature or by a heating bath.

The heating rate is preferably 4° C./minute or more, further preferably 8° C./minute or more, most preferably 12° C./minute or more. A higher heating rate is more preferred, and the upper limit is theoretically 10,000° C./second, technically 1,000° C./second, and practically 100° C./second. The heating rate is a value obtained by dividing the temperature difference between the start and end of the heating by the time required for completing the heating.

A uniform solution can be obtained in this manner. In a case where the dissolution is insufficient, the steps of cooling and heating may be repeated. The dissolution can be evaluated only by visually observing the appearance of the solution.

In the cooling dissolution method, a closable vessel is preferably used to prevent water contamination due to dew condensation in the cooling step. The dissolving time can be shortened by cooling under increased pressure and heating under reduced pressure, and a pressure resistant vessel is preferably used in this case.

When a cellulose acylate having an acetylation degree of 60.9% and a viscosity average polymerization degree of 299 is dissolved in methyl acetate by the cooling dissolution method, thus prepared 20% by mass solution has about 33° C. of a pseudo phase transition point between the sol and gel states, obtained by differential scanning calorimetry (DSC), and the solution is in the uniform gel state at the point or lower. Thus, the solution has to be maintained at the pseudo phase transition temperature or higher, preferably at a temperature of about 10° C. higher than the gel phase transition temperature. It should be noted that the pseudo phase transition temperature depends on the acetylation degree and viscosity average polymerization degree of the cellulose acylate, the solution concentration, and the organic solvent.

The cellulose acylate film may be produced from the prepared cellulose acylate solution (the dope) by a solution casting method. The dope is cast on a drum or band, and the solvent is evaporated to form the film. It is preferred that the concentration of the dope is controlled before the casting such that the solid content is 18 to 35%. The surface of the drum or band is preferably in the mirror-finished state. The casting and drying steps in the solution casting method are described in U.S. Pat. Nos. 2,336,310, 2,367,603, 2,492,078, 2,492,977, 2,492,978, 2,607,704, 2,739,069, and 2,739,070, British Patent Nos. 640731 and 736892, JP-B-45-4554, JP-B-49-5614, JP-A-60-176834, JP-A-60-203430, and JP-A-62-115035.

The dope is preferably cast on the drum or band having a surface temperature of 10° C. or lower. The dope is preferably air-dried for 2 seconds or more after the casting. The resultant film may be peeled off from the drum or band and further dried by hot air while successively changing the air temperature within the range of 100 to 160° C. to evaporate the residual solvent. This method is described in JP-B-5-17844. The time between the casting and the peeling can be reduced by using the method. To carry out the method, the dope has to be converted into a gel at the surface temperature of the drum or band in the casting step.

Plasticizer

A plasticizer may be added to the cellulose acylate film to improve the mechanical properties or drying speed. The plasticizer may be a phosphoric acid ester or a carboxylic acid ester. Examples of the phosphoric acid esters include triphenyl phosphate (TPP) and tricresyl phosphate (TCP). Typical carboxylic acid esters include phthalate esters and citrate esters. Examples of the phthalate esters include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of the citrate esters include triethyl O-acetylcitrate (OACTE) and tributyl O-acetylcitrate (OACTB). Examples of the other carboxylic acid esters include butyl oleate, methylacetyl ricinoleate, dibutyl sebacate, and trimellitic acid esters. The plasticizer is preferably a phthalate ester plasticizer such as DMP, DEP, DBP, DOP, DPP, or DEHP, and particularly preferably DEP or DPP.

The mass ratio of the plasticizer to the cellulose ester is preferably 0.1 to 25% by mass, more preferably 1 to 20% by mass, most preferably 3 to 15% by mass.

Degradation Inhibitor

A degradation inhibitor such as an antioxidant, peroxide decomposing agent, radical inhibitor, metal deactivator, acid scavenger, or amine may be added to the cellulose acylate film. The degradation inhibitor is described in JP-A-3-199201, JP-A-5-197073, JP-A-5-194789, JP-A-5-271471, and JP-A-6-107854. The mass ratio of the degradation inhibitor to the solution (the dope) is preferably 0.01 to 1% by mass, further preferably 0.01 to 0.2% by mass, in view of achieving the effects of the degradation inhibitor and preventing bleed out of the degradation inhibitor on the film surface. Particularly preferred examples of the degradation inhibitors include butylated hydroxytoluene (BHT) and tribenzylamine (TBA).

Ultraviolet Absorbent

The cellulose acylate film of the present invention may include an ultraviolet absorbent.

Examples of the ultraviolet absorbents include oxybenzophenone compounds, benzotriazole compounds, salicylic ester compounds, benzophenone compounds, cyanoacrylate compounds, and nickel complex salts, and preferred are benzotriazole compounds with small coloration. Further, also ultraviolet absorbents described in JP-A-10-182621 and JP-A-8-337574, and high-molecular ultraviolet absorbents described in JP-A-6-148430 may be preferably used. In a case of using the cellulose acylate film as a polarizing plate protective film in the invention, the ultraviolet absorbent is preferably excellent in absorptivity for ultraviolet rays with wavelengths of 370 nm or less in view of preventing deterioration of the polarizer and liquid crystal, and has preferably small absorption of visible lights with wavelengths of 400 nm or more in view of liquid crystal display properties.

Specific examples of the benzotriazole ultraviolet absorbent useful in the invention include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3", 4",5",6"-tetrahydrophthalimidomethyl)-5'-methylphenyl) benzotriazole, 2,2-methylene bis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2-(2H-benzotriazole-2-yl)-6-(straight or branched dodecyl)-4-methylphenols, and mixtures of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate, though the ultraviolet absorbent is not limited to the specific examples. Further, commercially available, TINUVIN 109, TINUVIN 171, and TINUVIN 326 (available from Ciba Specialty Chemicals) can be preferably used.

Fine Matting Agent Particles

Fine particles are preferably added as a matting agent to the cellulose acylate film of the invention. Examples of materials of the fine particles include silicon dioxide, titanium dioxide, aluminum oxide, zirconium oxide, calcium carbonate, talcs, clays, calcined kaolins, calcined calcium silicates, hydrated calcium silicates, aluminum silicate, magnesium silicate, and calcium phosphate. Among the materials for the fine particles, silicon-containing materials with low turbidity are preferred, and silicon dioxide is particularly preferred. The fine particles of silicon dioxide preferably have an average primary particle size of 1 to 20 nm and an apparent specific gravity of 70 g/L or more. It is more preferred that the fine particles has a smaller average primary particle size of 5 to 16 nm, and thereby can reduce haze of the film. The apparent specific gravity is preferably 90 to 200 g/L or more, more preferably 100 to 200 g/L or more. When the apparent specific gravity is higher, a dispersion liquid with a higher concentration can be prepared, so that the haze and aggregate are improved.

The fine particles generally form secondary particles having an average particle size of 0.05 to 2.0 µm, and the particles are aggregates of the primary particles in the film to form irregularity of 0.05 to 2.0 µm on the film surface. The average secondary particle size is preferably 0.05 to 1.0 µm, more preferably 0.1 to 0.7 µm, most preferably 0.1 to 0.4 µm. The primary and secondary particle sizes are each obtained as a diameter of a circle circumscribing the particle by scanning electron microscope observation, and the average particle sizes are each obtained by observing 200 particles in different positions and by taking the average thereof.

The fine particles of silicon dioxide may be a commercially available product such as AEROSIL R972, R972V, R974, R812, 200, 200V, 300, R202, OX50, or TT600 (available from Nippon Aerosil Co., Ltd.) The fine particles of zirconium oxide may be a commercially available product such as AEROSIL R976 and R811 (available from Nippon Aerosil Co., Ltd.)

Among them, AEROSIL 200V and AEROSIL R972V are fine silicon dioxide particles having an average primary particle size of 20 nm or less and an apparent specific gravity of 70 g/L or more, and thereby particularly preferably has a large effect of lowering the friction coefficient while maintaining the haze of the optical film at the low level.

An in-line mixer is preferably used for mixing a matting agent dispersing agent and an additive solution, and mixing with the cellulose acylate solution, though the mixing method is not limited thereto in the invention. When the fine silicon dioxide particles is mixed with and dispersed in a solvent, etc., the silicon dioxide concentration is preferably 5 to 30% by mass, more preferably 10 to 25% by mass, further preferably 15 to 20% by mass. When the dispersion concentration is higher, the turbidity corresponding to the same addition amount becomes lower, and the haze and aggregate are improved. In the resultant dope solution of the cellulose acylate, the content of the matting agent is preferably 0.001 to 1.0% by mass, more preferably 0.005 to 0.5% by mass, further preferably 0.01 to 0.1% by mass.

Stretching of Cellulose Acylate Film

The retardation of the cellulose acylate film can be controlled by stretching. The stretch ratio is preferably 1 to 200%, further preferably 2 to 100%, most preferably 5 to 40%.

The stretching may be carried out using a known method without departing from the scope of the invention, and a stretching method using a tenter is particularly preferred in view of in-plane uniformity. The cellulose acylate film of the invention preferably has a width of 100 cm or more, and the variation of the Re across the full width is preferably within ±5 nm, more preferably within ±3 nm. Further, the variation of the Rth is preferably within ±10 nm, more preferably within ±5 nm. Also the variations of the Re and Rth values in the length direction are preferably within the above ranges.

The stretching may be carried out in the middle of the film formation, and alternatively a formed taken-up film may be stretched. In the former case, a film containing a residual solvent may be stretched, and the residual solvent content is preferably 2 to 50% at the start of the stretching. In the tenter stretching, the start of the stretching is the time of securing both ends of a web (not properly dried dope) by clips, and the stretching is started further preferably at a residual solvent content of 5 to 50%, particularly preferably at a residual solvent content of 10 to 45%. The residual solvent content is calculated by the following equation.

$$\text{Residual solvent content} = 100 \times \{(\text{Solvent amount of web})/(\text{Total amount of web})\}$$

In this case, it is preferred that the film is transported in the longitudinal direction and stretched in a direction perpendicular to the longitudinal direction, so that the slow axis of the film is perpendicular to the longitudinal direction.

The thickness of the stretched cellulose acylate film is preferably 110 µm or less, more preferably 40 to 110 µm, further preferably 60 to 100 µm.

[Physical Properties of Film]

The physical film properties of the cellulose acylate film of the invention is described below.

(Retardation of Film)

In this invention, Re and Rth represent an in-plane retardation and a retardation in the thickness direction, respectively. The Re is measured by means of KOBRA 21ADH manufactured by Oji Scientific Instruments while applying a 590 nm wavelength light in the normal line direction of the film, unless otherwise noted. The Rth is, unless otherwise noted, calculated by KOBRA 21ADH based on 3 retardation values measured in 3 directions, the values being the retardation value Re, a retardation value measured while applying a 590 nm wavelength light from a direction tilted at +40° to the film normal line by using a slow axis of the Re (detected by KOBRA 21ADH) as a tilt axis (rotation axis), and a retardation value measured while applying a 590 nm wavelength light from a direction tilted at −40° to the film normal line by using the in-plane slow axis as a tilt axis (rotation axis). As assumed values of average refractive indexes, values described in *Polymer Handbook* (JOHN WILEY & SONS, INC.) and catalogs of various optical films can be used in the invention. Unknown average refractive indexes can be measured by an Abbe refractometer. The average refractive indexes of major optical film materials are as follows: cellulose acylate (1.48), cycloolefin polymer (1.52), polycarbonate (1.59), polymethyl methacrylate (1.49), polystyrene (0.1.59). By inputting the assumed average refractive index values and thicknesses, nx, ny, and nz are calculated by KOBRA 21ADH.

The $Re_{(590)}$ of the cellulose acylate film of the invention is preferably 20 to 250 nm, more preferably 20 to 150 nm, further preferably 30 to 100 nm. The $Rth_{(590)}$ is preferably 40 to 400 nm, more preferably 60 to 350 nm, further preferably 100 to 300 nm.

The ratio of $Re_{(590)}/Rth_{(590)}$ is preferably 0.1 to 2.0.

By controlling the Re and Rth within the above ranges, a cellulose acylate film with a high viewing angle compensating effect can be obtained.

The control can be achieved by selecting the type and amount of the retarder, and the stretch conditions of the cellulose acylate film.

(Humidity Dependency of Retardation)

In the cellulose acylate film of the invention, $Rth_{(590)}$ under 25° C. and 10% RH, $Rth_{(590)}$ under 25° C. and 60% RH, and $Rth_{(590)}$ under 25° C. and 80% RH preferably satisfies the following condition:

$$0 \leq Rth_{(590)} \text{ humidity dependency} \leq 30\%$$

wherein the $Rth_{(590)}$ humidity dependency represents $[(Rth_{(590)}$ under 25° C. and 10% RH–$Rth_{(590)}$ under 25° C. and 60% RH)/$Rth_{(590)}$ under 25° C. and 60% RH].

The $Rth_{(590)}$ humidity dependency is more preferably 2 to 28%, further preferably 2 to 25%, most preferably 5 to 20%.

When the cellulose acylate film of the invention is incorporated as an optical compensatory film in a liquid crystal display device, by controlling the humidity dependency of the retardation within the range, the viewing angle contrast changes of the device due to environmental humidity can be reduced.

(Haze)

The cellulose acylate film of the invention preferably has 0 to 1.0 of a value measured by a haze meter (1001DP available from Nippon Denshoku Industries Co., Ltd.), etc. The value is more preferably 0 to 0.8.

(Light Leakage)

The cellulose acylate used in the invention preferably has a lower depolarization property. The depolarization property of the film can be evaluated by light leakage, which is obtained from a luminance measured by sandwiching the film between 2 polarizing plates and by applying a constant light. The light leakage (%) is obtained by (luminance measured when the film is sandwiched between 2 polarizing plates placed in the crossed nicols state)/(luminance measured when the film is sandwiched between 2 polarizing plates placed in the para nicols state)×100.

The light leakage of the cellulose acylate film of the invention is preferably 0.01 to 0.50%, more preferably 0.05 to 0.30%.

(Surface Defect)

The cellulose acylate film of the invention is preferably such that, when the cellulose ester film is sampled, the number of foreign substances and aggregates with size of 30 μm or more is 0 to 50 in a region with a width of 30 cm and a length of 1 m. The number is more preferably 0 to 40, particularly preferably 0 to 30.

(Surface Treatment of Cellulose Acylate Film)

The cellulose acylate film may be subjected to a surface treatment if necessary. Examples of the surface treatments include saponification treatments, plasma treatments, flame treatments, and UV irradiation treatments. The saponification treatments include acid saponification treatments and alkali saponification treatments. The plasma treatments include corona discharge treatments and glow discharge treatments. It is preferred that the temperature of the cellulose acylate film is controlled at the glass-transition temperature (Tg) or lower, specifically at 150° C. or lower in the surface treatments to maintain the film flatness. The cellulose acetate film preferably has a surface energy of 55 to 75 mN/m after the surface treatment.

The glow discharge treatment may be a low-temperature plasma treatment under low-pressure gas of $10^{-3}$ to 20 Torr, or a plasma treatment under atmospheric pressure. A plasma gas used in the treatment is a gas that can be plasma-activated under the above conditions, and examples thereof include argon, helium, neon, krypton, xenon, nitrogen, carbon dioxide, freons such as tetrafluoromethane, and mixtures thereof. They are described in detail in *Kokai Giho (JIII Journal of Technical Disclosure)*, No. 2001-1745, published in Mar. 15, 2001, Japan Institute of Invention and Innovation, Page 30 to 32. In the plasma treatments under atmospheric pressure, attracting much attention recently, for instance an irradiation energy of 20 to 500 kGy is used under 10 to 1000 keV, and an irradiation energy of 20 to 300 kGy is used under 30 to 500 keV more preferably. Particularly preferred among the treatments are the alkali saponification treatments, which are remarkably efficient as the surface treatment for the cellulose acylate film.

The alkali saponification treatment is preferably carried out by soaking the cellulose acylate film directly in a saponification solution bath or by coating the cellulose acylate film with a saponification solution. Examples of the coating methods include dip coating methods, curtain coating methods, extrusion coating methods, bar coating methods, and E coating methods. It is preferred that a solvent of the alkali saponification coating liquid has an excellent wetting property for coating a transparent support, and does not form unevenness on the transparent support to maintain excellent surface properties. Specifically, the solvent is preferably an alcohol solvent, particularly preferably isopropyl alcohol. Further, an aqueous solution of a surfactant may be used as the solvent. An alkali of the alkali saponification coating liquid is preferably dissolved in the solvent, and is further preferably KOH or NaOH. The pH value of the saponification coating liquid is preferably 10 or more, more preferably 12 or more. The alkali saponification reaction may be carried out at room temperature preferably for 1 second to 5 minutes, more preferably for 5 seconds to 5 minutes, particularly preferably for 20 seconds to 3 minutes. After the alkali saponification reaction, the saponification solution-coated surface is preferably water-washed, or washed with an acid and then water-washed.

The surface energy of thus-obtained solids can be obtained by a contact angle method, wet heating method, or adsorption method as described in *Nure no Kiso to Oyo*, Realize Co., Ltd., Dec. 10, 1989. The contact angle method is preferably used for the cellulose acylate film of the invention. Specifically, the surface energy of the film can be calculated such that two solutions with known surface energies are dropped onto the cellulose acylate film, angles between the film surface and a tangent to the droplet are measured in an intersection of the droplet surface and the film surface, and one of the angles, containing the droplet, is defined as a contact angle.

A cellulose acylate film having a surface energy of 55 to 75 mN/m can be obtained by subjecting the film to the surface treatment. When the cellulose acylate film is used as a transparent protective film for a polarizing plate, the adhesion between the polarizing film and the cellulose acylate film is improved. Further, in the case of using the cellulose acylate film of the invention in an OCB mode liquid crystal display device, an alignment film may be formed on the cellulose acylate film, and an optically anisotropic layer containing a discotic compound or a rod-like liquid crystalline compound may be formed thereon. The optically anisotropic layer is formed by aligning the discotic compound or rod-like liquid crystalline compound on an alignment film, and by fixing the alignment state. In the case of forming the optically anisotropic layer on the cellulose acylate film in this manner, conventionally a gelatin undercoat layer has to be formed between the cellulose acylate film and the alignment film to obtain a sufficient adhesiveness between the cellulose acylate film and the alignment film. When the cellulose acylate film having the surface-energy of 55 to 75 mN/m according to the invention is used, the gelatin undercoat layer is not needed.

[Optical Materials Using Cellulose Acylate Film]

(Optical Compensatory Film)

The cellulose acylate film of the invention can be used as an optical compensatory film. Particularly the cellulose acylate film, which satisfies the above conditions of the retardation values Re and Rth, and the Re/Rth ratio, and has a thickness of 40 to 110 μm, can act as the optical compensatory film singly.

The cellulose acylate film of the invention is preferably used as the optical compensatory film.

(Polarizing Plate)

Structure of Polarizing Plate

The cellulose acylate film of the invention can be preferably used as a protective film of a polarizing plate. First the protective film and a polarizer for the polarizing plate of the invention are described below.

The polarizing plate of the invention may have an adhesive layer, a separation film, or a protective film in addition to the polarizer and the protective film.

(1) Protective Film

The polarizing plate of the invention has the polarizer and 2 protective films disposed on the both sides of the polarizer, and at least one of the protective films is the cellulose acylate film of the invention. It is preferred that at least one of the 2 protective films has also a function as a retardation film. In the case of using the polarizing plate of the invention for a liquid crystal display device, it is preferred that at least one of 2 polarizing plates disposed on the both sides of a liquid crystal cell is the polarizing plate of the invention.

The protective film other than the cellulose acylate film of the invention is preferably a polymer film of a norbornene resin, polyethylene terephthalate, polyethylene naphthalate, polycarbonate, polystyrene, polyarylate, polysulfone, cellulose acylate, etc.

(2) Polarizer

The polarizer used in the invention is preferably composed of a polyvinyl alcohol (PVA) and a dichroic molecule, and may be a polyvinylene polarizer prepared by subjecting a PVA or polyvinyl chloride to dehydration or dechlorination and by aligning the generated polyene structure as described in JP-A-11-248937.

The PVA is preferably a polymer material obtained by saponifying a polyvinyl acetate, and may contain a component capable of copolymerizing with vinyl acetate, such as an unsaturated carboxylic acid, an unsaturated sulfonic acid, an olefin, or a vinyl ether. Further, modified PVAs having an acetoacetyl group, sulfonic acid group, carboxyl group, oxyalkylene group, etc. may be used in the invention.

The saponification degree of the PVA is not particularly limited, and is preferably 80 to 100 mol %, particularly preferably 90 to 100 mol %, from the viewpoint of solubility, etc. The polymerization degree of the PVA is not particularly limited, preferably 1,000 to 10,000, particularly preferably 1,500 to 5,000.

It is preferred that the syndiotacticity of the PVA is 55% or more in view of improving the durability as described in Japanese Patent No. 2978219. It is also preferred that the syndiotacticity is 45 to 52.5% as described in Japanese Patent No. 3317494.

It is preferred that the PVA is formed into a film and then a dichroic molecule is introduced to prepare the polarizer. Generally the PVA film is preferably produced by casting a liquid prepared by dissolving a PVA-based resin in water or an organic solvent. The polyvinyl alcohol-based resin concentration of the liquid is generally 5 to 20% by mass, and a 10 to 200-μm-thick PVA film may be formed by casting the liquid. The PVA film can be produced with reference to Japanese Patent No. 3342516, JP-A-09-328593, JP-A-2001-302817, JP-A-2002-144401, etc.

The crystallinity degree of the PVA film is not particularly limited. The average crystallinity degree (Xc) may be 50 to 75% by mass as described in Japanese Patent No. 3251073, and the crystallinity degree may be 38% or less to reduce the in-plane hue unevenness as described in JP-A-2002-236214.

The PVA film preferably has a small birefringence ($\Delta n$), and the birefringence is preferably $1.0 \times 10^{-3}$ or less as described in Japanese Patent No. 3342516. The birefringence of the PVA film may be 0.02 to 0.01 to obtain a high polarization degree while preventing breakage of the PVA film in the stretching step as described in JP-A-2002-228835. Further, the value of (nx+ny)/2−nz may be 0.0003 to 0.01 as described in JP-A-2002-060505. The in-plane retardation (Re) of the PVA film is preferably 0 to 100 nm, further preferably 0 to 50 nm. Further, the retardation in the thickness direction (Rth) of the PVA film is preferably 0 to 500 nm, further preferably 0 to 300 nm.

Additionally, a PVA film having a bonding 1,2-glycol amount of 1.5 mol % or less described in Japanese Patent No. 3021494, a PVA film having 500 or less optically foreign substances of 5 μm or more in size per 100 cm² described in JP-A-2001-316492, a PVA film having a hot water breaking temperature of 1.5° C. or lower in the TD direction described in JP-A-2002-030163, and a PVA film prepared from a solution containing 1 to 100 parts by mass of 3 to 6-polyvalent alcohol such as glycerin or 15% by mass or more of a plasticizer described in JP-A-06-289225 can be preferably used for the polarizing plate in the invention.

The film thickness of the unstretched PVA film is not particularly limited, preferably 1 μm to 1 mm, particularly preferably 20 to 200 μm from the viewpoint of the film stability and uniform stretching. Such a thin PVA film that 10 N or less of stress is generated in the stretching in water at a ratio of 4 to 6 times may be used as described in JP-A-2002-236212.

The dichroic molecule may be a higher iodine ion such as $I_3^-$ or $I_5^-$, or a dichroic dye. The higher iodine ion is particularly preferably used in the invention. The higher iodine ion can be generated such that the PVA is soaked in a liquid prepared by dissolving iodine in an aqueous potassium iodide solution and/or an aqueous boric acid solution to adsorb the iodine to the PVA as described in *Henkoban no Oyo*, Ryo Nagata, CMC and *Kogyo Zairyo*, Vol. 28, No. 7, Page 39 to 45.

In the case of using the dichroic dye as the dichroic molecule, the dichroic dye is preferably an azo dye, particularly preferably a bisazo or trisazo dye. The dichroic dye is preferably water-soluble, and thus a hydrophilic substituent such as a sulfonic acid group, an amino group, or a hydroxyl group is preferably introduced to a dichroic molecule, to generate a free acid, an alkaline metal salt, an ammonium salt, or an amine salt.

Specific examples of the dichroic dyes include benzidine dyes such as C.I. Direct Red 37, Congo Red (C.I. Direct Red 28), C.I. Direct Violet 12, C.I. Direct Blue 90, C.I. Direct Blue 22, C.I. Direct Blue 1, C.I. Direct Blue 151, and C.I. Direct Green 1; diphenylurea dyes such as C.I. Direct Yellow 44, C.I. Direct Red 23, and C.I. Direct Red 79; stilbene dyes such as C.I. Direct Yellow 12; dinaphtylamine dyes such as C.I. Direct Red 31; J acid dyes such as C.I. Direct Red 81, C.I. Direct Violet 9, and C.I. Direct Blue 78.

In addition, the dichroic dyes preferably used in the invention include C.I. Direct Yellow 8, C.I. Direct Yellow 28, C.I. Direct Yellow 66, C.I. Direct Yellow 87, C.I. Direct Yellow 142, C.I. Direct Orange 26, C.I. Direct Orange 39, C.I. Direct Orange 72, C.I. Direct Orange 106, C.I. Direct Orange 107, C.I. Direct Red 2, C.I. Direct Red 39, C.I. Direct Red 83, C.I. Direct Red 89, C.I. Direct Red 240, C.I. Direct Red 242, C.I. Direct Red 247, C.I. Direct Violet 48, C.I. Direct Violet 51, C.I. Direct Violet 98, C.I. Direct Blue 15, C.I. Direct Blue 67, C.I. Direct Blue 71, C.I. Direct Blue 98, C.I. Direct Blue 166, C.I. Direct Blue 202, C.I. Direct Blue 236, C.I. Direct Blue 249, C.I. Direct Blue 270, C.I. Direct Green 59, C.I. Direct Green 65, C.i. Direct Brown 44, C.I. Direct Brown 106, C.I. Direct Brown 195, C.I. Direct Brown 210, C.I. Direct Brown 223, C.I. Direct Brown 224, C.I. Direct Black 1, C.I. Direct Black 17, C.I. Direct Black 19, C.I. Direct Black 54, and dyes described in JP-A-62-70802, JP-A-1-161202, JP-A-1-172906, JP-A-1-172907, JP-A-1-163602, JP-A-1-248105, JP-A-1-265205, and JP-A-7-261024. Two or more dichroic dyes may be used in combination to obtain various hues. In the case of using the dichroic dye, the adsorption thickness may be 4 μm or more as described in JP-A-2002-082222.

The ratio of the dichroic molecule to the film matrix of the polyvinyl alcohol-based polymer is generally controlled within a range of 0.01 to 5% by mass. Too low dichroic molecule content results in reduction of polarization degree, and excessively high dichroic molecule content results in reduction of the single-plate transmittance.

The thickness of the polarizer is preferably 5 to 40 μm, more preferably 10 to 30 μm. Further, it is preferred that the thickness ratio of the polarizer to the protective film described below satisfies the condition of $0.01 \leq D_A$ (Polarizer thickness)$/D_B$ (Protective film thickness)$\geq 0.16$ as described in JP-A-2002-174727.

Further, the crossing angle between the slow axis of the protective film and the absorption axis of the polarizer may be any one, and it is preferred that the axes are parallel or the crossing angle is an azimuthal angle of 45±20°.

(Production of Polarizing Plate)

Processes for producing the polarizing plate in the invention are described below.

In the invention, the polarizing plate is preferably produced by a method having a swelling step, dyeing step, hardening step, stretching step, drying step, protective film attaching step, and attached film drying step. The order of the dyeing, hardening, and stretching steps may be changed, and some steps may be combined and simultaneously carried out. It is preferred that the film is water-washed after the hardening step as described in Japanese Patent No. 3331615.

In the invention, the swelling, dyeing, hardening, stretching, drying, protective film attaching, and attached film drying steps are particularly preferably carried out in this order. On-line surface evaluation may be carried out in or after the steps.

Though the swelling step is preferably carried out using only water, a polarizing plate matrix may be swelled by an aqueous boric acid solution, thereby controlling the swelling degree to improve the optical performance stability and prevent wrinkling of the matrix in the production line as described in JP-A-10-153709.

The temperature and time of the swelling may be any one, and are preferably 10 to 60° C. and 5 to 2,000 seconds.

The dyeing step may be carried out using a method described in JP-A-2002-86554. The dyeing may be achieved by soaking, application or spraying of an iodine or dye solution, etc. Further, the dyeing may be carried out while controlling the iodine concentration, dyeing bath temperature, and stretch ratio in the bath and while stirring the solution in the bath as described in JP-A-2002-290025.

In the case of using the higher iodine ion as the dichroic molecule, in the dyeing step, a solution prepared by dissolving iodine in an aqueous potassium iodide solution is preferably used to obtain a high-contrast polarizing plate. It is preferred that, in the aqueous iodine-potassium iodide solution, the iodine concentration is 0.05 to 20 g/l, the potassium iodide concentration is 3 to 200 g/l, and the mass ratio of iodine and potassium iodide is 1 to 2,000. The dyeing time is preferably 10 to 1,200 seconds, and the solution temperature is preferably 10 to 60° C. It is more preferred that the iodine concentration is 0.5 to 2 g/l, the potassium iodide concentration is 30 to 120 g/l, the mass ratio of iodine and potassium iodide is 30 to 120, the dyeing time is 30 to 600 seconds, and the solution temperature is 20 to 50° C.

A boron compound such as boric acid or borax may be added to the dyeing solution as described in Japanese Patent No. 3145747.

In the hardening step, the PVA film is preferably soaked in a crosslinking agent solution or coated with the solution, thereby adding a crosslinking agent to the film. The hardening step may be carried out in several batches as described in JP-A-11-52130.

The crosslinking agent may be an agent described in U.S. Reissue Pat. No. 232897. Also a boron compound such as boric acid or borax may be used as the crosslinking agent. The crosslinking agent is most preferably a boric acid compound though it may be a polyvalent aldehyde for increasing the dimension stability as described in Japanese Patent No. 3357109. In the case of using boric acid as the crosslinking agent in the hardening step, a metal ion may be added to an aqueous boric acid-potassium iodide solution. A compound containing the metal ion is preferably zinc chloride, and zinc salts including zinc halides such as zinc iodide, zinc sulfate, and zinc acetate may be used instead of zinc chloride as described in JP-A-2000-35512.

In the invention, the PVA film is preferably hardened by soaking the film in an aqueous boric acid-potassium iodide solution containing zinc chloride. It is preferred that the boric acid concentration is 1 to 100 g/l, the potassium iodide concentration is 1 to 120 g/l, the zinc chloride concentration is 0.01 to 10 g/l, the hardening time is 10 to 1,200 seconds, and the solution temperature is 10 to 60° C. It is more preferred that the boric acid concentration is 10 to 80 g/l, the potassium iodide concentration is 5 to 100 g/l, the zinc chloride concentration is 0.02 to 8 g/l, the hardening time is 30 to 600 seconds, and the solution temperature is 20 to 50° C.

In the stretching step, a vertical monoaxial stretching method described in U.S. Pat. No. 2,454,515, etc. and a tentering method described in JP-A-2002-86554 can be preferably used. The stretch ratio is preferably 2 to 12 times, more preferably 3 to 10 times. It is preferred that the stretch ratio, the film thickness, and the polarizer thickness satisfies the condition of (Thickness of protective film-attached polarizer/Thickness of film)×(Total stretch ratio)>0.17 as described in JP-A-2002-040256, and that the width of the polarizer taken from final bath and the width of the polarizer at the time of attaching the protective film satisfies the condition of 0.80≦(Width of polarizer at attaching protective film/Width of polarizer taken from final bath)≦0.95, as described in JP-A-2002-040247.

In the drying step, a known method described in JP-A-2002-86554 may be used, and the drying temperature is preferably 30 to 100° C., and the drying time is preferably 30 seconds to 60 minutes. It is also preferred that a heat treatment for controlling an in-water discoloring temperature at 50° C. or higher is carried out as described in Japanese Patent No. 3148513, and that an aging treatment under controlled temperature and humidity is carried out as described in JP-A-07-325215 and JP-A-07-325218.

In the protective film attaching step, 2 protective films are bonded to both sides of the polarizer after the drying step. It is preferred that an adhesive liquid is applied immediately before the bonding, and the polarizer is sandwiched between and bonded to the protective films by a couple of rollers. It is preferred that the water content of the polarizer is controlled at the time of the bonding, to prevent concavity and convexity like grooves in a record due to the stretching as described in JP-A-2001-296426 and JP-A-2002-86554. In the invention, the water content is preferably 0.1 to 30%.

The adhesive for bonding the polarizer and the protective films is not particularly limited, and examples thereof include PVA-based resins (including PVAs modified with an acetoacetyl group, a sulfonic acid group, a carboxyl group, an oxyalkylene group, etc.) and aqueous boron compound solutions. The adhesive is preferably the PVA-based resin. The thickness of the dried adhesive layer is preferably 0.01 to 5 μm, particularly preferably 0.05 to 3 μm.

It is preferred that, to increase the adhesive strength between the polarizer and the protective films, the protective films are surface-treated to be hydrophilic, and then bonded to the polarizer. The surface treatment is not particularly restricted and may be a known treatment such as a saponification treatment using an alkali solution or a corona treatment. Further, a highly adhesive layer such as a gelatin undercoat layer may be formed after the surface treatment. It is preferred that the contact angle of the protective film surface against water is 50° or less as described in JP-A-2002-267839.

The conditions of drying after the bonding may be those described in JP-A-2002-86554, and the drying temperature is preferably 30 to 100° C. and the drying time is preferably 30 seconds to 60 minutes. Further, it is preferred that an aging treatment under controlled temperature and humidity is carried out as described in JP-A-07-325220.

Each element content of the polarizer is preferably such that the iodine content is 0.1 to 3.0 g/m$^2$, the boron content is 0.1 to 5.0 g/m$^2$, the potassium content is 0.1 to 2.00 g/m$^2$, and the zinc content is 0 to 2.00 g/m$^2$. The potassium content may be 0.2% by mass or less as described in JP-A-2001-166143, and the zinc content may be 0.04% to 0.5% by mass as described in JP-A-2000-035512.

An organic titanium compound and/or an organic zirconium compound may be added to the film in any of the dyeing, stretching, and hardening steps, to increase the dimension stability of the polarizing plate, as described in Japanese Patent No. 3323255. Further, a dichroic dye may be added to control the hue of the polarizing plate.

(Properties of Polarizing Plate)

(1) Transmittance and Polarization Degree

In the invention, the single-plate transmittance of the polarizing plate defined by the Equation 3 below is preferably 42.5% to 49.5%, more preferably 42.8% to 49.0%. The polarization degree defined by the following Equation 4 is preferably 99.900% to 99.999%, more preferably 99.940% to 99.995%. The parallel transmittance is preferably 36% to 42%, and the perpendicular transmittance is preferably 0.001% to 0.05%.

$$\text{Polarization degree (\%)} = \sqrt{\{(Pa-Pe)/(Pa+Pe)\}} \qquad \text{Equation 1}$$

Pa: Parallel transmittance

Pe: Perpendicular transmittance

The transmittance is defined by the following equation in accordance with JIS Z8701.

$$T = K \int S(\lambda) y(\lambda) \tau(\lambda) d\lambda \qquad \text{Equation 3}$$

In the Equation 3, K, S(λ), y(λ), and τ(λ) are as follows.

$$K = \frac{100}{\int S(\lambda) y(\lambda) d\lambda}$$

S(λ): Spectral distribution of standard light for color display y(λ): Color matching function in XYZ system (CIE 1931 color system)

τ(λ): Spectral transmittance

The dichroic ratio defined by the following Equation 5 is preferably 48 to 1215, more preferably 53 to 525.

$$\text{Dichroic ratio } (Rd) = \frac{\log\left[\frac{\text{Single-plate transmittance}}{100}\left(1 - \frac{\text{Polorization degree}}{100}\right)\right]}{\log\left[\frac{\text{Single-plate transmittance}}{100}\left(1 + \frac{\text{Polorization degree}}{100}\right)\right]} \qquad \text{Equation 5}$$

The iodine concentration and the single-plate transmittance may be in ranges described in JP-A-2002-258051, Paragraph 0017.

The wavelength dependency of the parallel transmittance may be lower as described in JP-A-2001-083328 and JP-A-2002-022950. In the case of placing the polarizing plate in the crossed nicols state, the optical property may be in a range described in JP-A-2001-091736, Paragraph 0007, and the relation between the parallel transmittance and the perpendicular transmittance may be in a range described in JP-A-2002-174728, Paragraph 0006.

As described in JP-A-2002-221618, in a light wavelength range of 420 to 700 nm, the standard deviation of parallel transmittance of every 10 nm may be 3 or less, and the minimum values of (Parallel transmittance/Perpendicular transmittance) of every 10 nm may be 300 or more.

Also it is preferred that the parallel transmittance and the perpendicular transmittance of the polarizing plate at a wavelength of 440 nm, those at a wavelength of 550 nm, and those at a wavelength of 610 nm are within ranges described in JP-A-2002-258042, Paragraph 0012 or JP-A-2002-258043, Paragraph 0012.

(2) Hue

The hue of the polarizing plate of the invention is preferably evaluated by using a lightness index L* and chromaticness indexes a* and b* of an L*a*b* calorimetric system with a CIE uniform color space.

L*, a*, and b* are defined using X, Y, and Z of the above XYZ colorimetric system by the mathematical expression (6):

$$L^* = 116(Y/Y_0)^{\frac{1}{3}} - 16$$
$$a^* = 500\left[(X/X_0)^{\frac{1}{3}} - (Y/Y_0)^{\frac{1}{3}}\right]$$
$$b^* = 200\left[(Y/Y_0)^{\frac{1}{3}} - (Z/Z_0)^{\frac{1}{3}}\right]$$

In the expression, $X_0$, $Y_0$, and $Z_0$ represent tristimulus values of an illuminated light source, and are 98.072, 100, and 118.225 respectively in the case of the standard light C, and are 95.045, 100, and 108.892 in the case of the standard light $D_{65}$.

The a* of one polarizing plate is preferably −2.5 to 0.2, more preferably −2.0 to 0. The b* of one polarizing plate is preferably 1.5 to 5, more preferably 2 to 4.5. The a of a parallel transmitted light in two polarizing plates is preferably −4.0 to 0, more preferably −3.5 to −0.5. The b of a parallel transmitted light in two polarizing plates is preferably 2.0 to 8, more preferably 2.5 to 7. The a* of a perpendicular transmitted light in two polarizing plates is preferably −0.5 to 1.0, more preferably 0 to 2. The b* of a perpendicular transmitted light in two polarizing plates is preferably −2.0 to 2, more preferably −1.5 to 0.5.

The hue may be evaluated by chromaticity coordinates (x, y) calculated from the above X, Y, and Z. For example, it is preferred that the parallel transmitted light chromaticity ($x_p$, $y_p$) and the perpendicular transmitted light chromaticity ($x_c$, $y_c$) of two polarizing plates are within ranges described in JP-A-2002-214436, Paragraph 0017, JP-A-2001-166136, Paragraph 0007, or JP-A-2002-169024, Paragraph 0005 to 0006, and that the relation between the hue and absorbance is within a range described in JP-A-2001-311827, Paragraph 0005 to 0006.

(3) Viewing Angle Properties

It is preferred that, when the polarizing plate is disposed in the crossed nicols state and a light having a wavelength of 550 nm is injected thereinto, the transmittance ratio and the xy chromaticity differences between a vertically light injection and a light injected from an angle of 45° against the polarizing axis at an angle of 40' against the normal line are within ranges described in JP-A-2001-166135 or JP-A-2001-166137. It is preferred that the ratio $T_{60}/T_0$, in which $T_0$ is a light transmittance of a polarizing plate stack placed in the crossed nicols state in the vertically direction and $T_{60}$ is a light transmittance in the direction at an angle of 60° against the normal line of the stack, is 10,000 or less as described in JP-A-10-068817. It is preferred also that, in a case where a natural light is injected to the polarizing plate from the normal line direction or at an elevation angle of 80' or less, the transmittance difference of transmitted lights is 6% or less in 20 nm within a transmission spectrum wavelength range of 520 to 640 nm as described in JP-A-2002-139625. Further, it is preferred that the brightness difference of the transmitted lights between regions 1 cm away from each other is 30% or less as described in JP-A-08-248201.

(4) Durability (4-1) Temperature and Humidity Durability

When the light transmittance and polarization degree are measured before and after the polarizing plate is left under a temperature of 60° C. and a relative humidity of 90% for 500 hours as described in JP-A-2001-116922, the change of the light transmittance and polarization degree are preferably 3% or less based on the absolute values. The change of the light transmittance is particularly preferably 2% or less, and the change of the polarization degree is particularly preferably 1.0% or less, more preferably 0.1% or less, based on the absolute values. Further, it is preferred that the polarizing plate has a polarization degree of 95% or more and a single transmittance of 38% or more after the polarizing plate is left under a temperature of 80° C. and a relative humidity of 90% for 500 hours' as described in JP-A-07-077608.

(4-2) Dry Durability

When the light transmittance and polarization degree are measured before and after the polarizing plate is left under a dry condition at 80° C. for 500 hours, the change of the light transmittance and polarization degree are preferably 3% or less based on the absolute values. The change of the light transmittance is particularly preferably 2% or less, and the change of the polarization degree is particularly preferably 1.0% or less, furthermore preferably 0.1% or less, based on the absolute values.

(4-3) Other Durability

Further, it is preferred that the shrinkage ratio of the polarizing plate by leaving the polarizing plate at 80° C. for 2 hours is 0.5% or less as described in JP-A-06-167611. Also it is preferred that, when a stack is prepared by disposing the polarizing plates on the both sides of a glass plate in the crossed nicols state and left at 69° C. for 750 hours, x and y values of the stack are within ranges described in JP-A-10-068818 after the leaving. Furthermore, it is preferred that, when the polarizing plate is left at 80° C. under a relative humidity of 90% for 200 hours, the change of spectral intensity ratio between 105 cm$^{-1}$ and 157 cm$^{-1}$ obtained by Raman spectroscopy is within a range described in JP-A-08-094834 or JP-A-09-197127.

(5) Alignment Degree

More excellent polarization performance is achieved as the alignment degree of the PVA is increased. The alignment degree calculated as order parameter values by polarized Raman scattering or polarized FT-IR, etc. is preferably 0.2 to 1.0. Also it is preferred that difference between an alignment coefficient of a high-molecular segment in the entire amorphous region of the polarizer and an alignment coefficient of occupying molecules (0.75 or more) is at least 0.15 as described in JP-A-59-133509. Further, it is preferred that the alignment coefficient of the amorphous region in the polarizer is 0.65 to 0.85 or that the alignment degree of the higher iodine ion such as $I_3^-$ and $I_5^-$ is 0.8 to 1.0 as an order parameter value as described in JP-A-04-204907.

(6) Other Properties

It is preferred that the shrinkage force per unit width in the absorption axis direction is 4.0 N/cm or less when the polarizing plate is heated at 80° C. for 30 minutes as described in JP-A-2002-006133, that the dimension changes of the polarizing plate in the absorption axis direction and the polarizing axis direction are both within 0.0.6% when the polarizing plate is heated at 70° C. for 120 hours as described in JP-A-2002-236213, and that the water content of the polarizing plate is 3% by mass or less as described in JP-A-2002-090546. Further, it is preferred that the surface roughness in a direction vertically to the stretching axis is 0.04 μm or less based on the center line average roughness as described in JP-A-2000-249832, that the refractive index $n_0$ in the transmission axis direction is 1.6 or more as described in JP-A-10-268294, and that the relation between the polarizing plate thickness and the protective film thickness is within a range described in JP-A-10-111411, Paragraph 0004.

(Liquid Crystal Display Device)

The polarizing plate using the cellulose acylate film of the invention can be preferably used in a liquid crystal display device. The polarizing plate of the invention can be used for liquid crystal cells using various display modes. The display modes proposed include TN (Twisted Nematic), IPS (In-Plane Switching), FLC (Ferroelectric Liquid Crystal), AFLC (Anti-ferroelectric Liquid Crystal), OCB (Optically Compensatory Bend), STN (Supper Twisted Nematic), VA (Vertically Aligned), and HAN (Hybrid Aligned Nematic) modes. The polarizing plate is preferably used for the OCB or VA mode.

The OCB mode liquid crystal cell is such a bend alignment mode liquid crystal cell that rod-like liquid crystal molecules in the upper portion and the molecules in the lower portion are aligned in substantially opposite directions (symmetrically). The OCB mode liquid crystal cells are disclosed in U.S. Pat. Nos. 4,583,825 and 5,410,422. The rod-like liquid crystal molecules in the upper and lower portions are symmetrically aligned, whereby the bend alignment mode liquid crystal cell has a self-optical compensatory function. Thus, the liquid crystal mode is referred to also as an OCB (Optically Compensatory Bend) liquid crystal mode. The bend alignment mode liquid crystal displays are advantageous in high response speeds.

In the VA mode liquid crystal cell, the rod-like liquid crystal molecules are substantially vertically aligned when no voltage is applied thereto.

The VA mode liquid crystal cells include (1) narrowly-defined VA mode liquid crystal cells described in JP-A-2-176625, the rod-like liquid crystal molecules being substantially vertically aligned under no applied voltage, and the molecules being substantially horizontally aligned under an applied voltage; (2) MVA mode liquid crystal cells described in *SID97, Digest of tech. Papers (Yokosyu)*, 28 (1997), 845, obtained by forming a multidomain structure in the VA mode cells to increase the viewing angles; (3) n-ASM mode liquid crystal cells described in *Nippon Ekisyo Toronkai Yokosyu*, 58 to 59 (1998), the rod-like liquid crystal molecules are substantially vertically aligned under no applied voltage, and the molecules are aligned in a twisted multidomain state under an applied voltage; and (4) SURVAIVAL mode liquid crystal cells announced in LCD International 98.

In the OCB mode and VA mode liquid crystal display devices, two polarizing plates may be disposed on the both sides of the liquid crystal cell. In the VA mode, the polarizing plate may be disposed on the cell on the side facing the backlight. In the liquid crystal cell, the liquid crystal molecules are supported between two electrode substrates.

EXAMPLES

The present invention will be explained more specifically with reference to Examples and Comparative Examples. Materials, amounts, ratios, treatments, procedures, etc. used in Examples may be changed without departing from the scope of the invention. Thus, the scope of the invention is not limited to the following specific examples.

Example 1

Production of Cellulose Acylate Film 101

<Preparation of Cellulose Acetate Solution>

The following composition was added to a mixing tank and stirred to dissolve the components, so that a cellulose acetate solution 01 was prepared.

| Composition of cellulose acylate solution 01 | |
|---|---|
| Cellulose acetate having acetylation degree of 2.87 | 100.0 parts by mass |
| C-7 (Hydrophobizing agent) | 3.0 parts by mass |
| C-8 (Hydrophobizing agent) | 3.0 parts by mass |
| Methylene chloride (First solvent) | 402.0 parts by mass |
| Methanol (Second solvent) | 60.0 parts by mass |

<Preparation of Matting Agent Solution 11>

The following composition was put in a disperser, and stirred to dissolve the components, to prepare a matting agent solution.

| Composition of matting agent solution 11 | |
|---|---|
| Silica particles having average particle size of 20 nm (AEROSIL R972 available from Nippon Aerosil Co., Ltd. | 2.0 parts by mass |
| Methylene chloride (First solvent) | 75.0 parts by mass |
| Methanol (Second solvent) | 12.7 parts by mass |
| Cellulose acylate solution 01 | 10.3 parts by mass |

<Preparation of Retarder 21 Solution>

The following composition was added to a mixing tank and stirred under heating to dissolve the components, so that a retarder solution was prepared.

| Composition of retarder solution 21 | |
|---|---|
| Retarder (A-21) | 10.0 parts by mass |
| Retarder (A-22) | 10.0 parts by mass |
| Methylene chloride (First solvent) | 58.4 parts by mass |
| Methanol (Second solvent) | 8.7 parts by mass |
| Cellulose acylate solution 01 | 12.8 parts by mass |

1.3 parts by mass of the matting agent solution and 2.5 parts by mass of the retarder solution were filtered and then mixed by an in-line mixer, and further 956.2 parts by mass of the cellulose acylate solution 01 was added thereto and mixed by an in-line mixer, and the resultant was cast by a band casting apparatus. The film containing 31% of residual solvent was peeled from the band, transversely stretched at a stretch ratio of 17% using a tenter at 140° C., and left at 140° C. for 30 seconds. The film had a residual solvent content of 12% at the start of the stretching. Then, clips were removed and the film was dried at 130° C. for 40 minutes, to produce a cellulose acylate film 101. Thus produced cellulose acylate film 101 had a residual solvent content of 0.2%, a thickness o 82 μm, a haze of 0.50, a light leakage of 0.16%, and a glass-transition temperature of 150° C. The number of foreign substances with size of 30 μm or more is less than 20 in a region with a width of 30 cm and a length of 1 m of both ends of the film.

Example 2

Production of Cellulose Acylate Films 102 to 108

Cellulose acylate films 102 to 108 according to the invention were produced in the same manner as Example 1 except for using the cellulose acylates, retarders, retarder amounts, under each conditions of 25° C. and 10% relative humidity (RH), 25° C. and 60% RH, and 25° C. and 80% RH by KOBRA 21ADH manufactured by Oji Scientific Instruments. The results are shown in Table 2. In Table 1, the values of Amount* are weight ratio (%) to the cellulose acylate. Further, in Table 2, Humidity dependency of $Rth_{(590)}$ is a value obtained by ($Rth_{(590)}$ under 25° C. and 10% RH– $Rth_{(590)}$ under 25° C. and 80% RH)/$Rth_{(590)}$ under 25° C. 60% RH.

TABLE 1

| Cellulose acylate film | Cellulose acylate | | | Retarder (1) | | Retarder (2) | | Hydrophobizing agent (1) | | Hydrophobizing agent (2) | | Note |
| | Acelylation degree | Propionylation degree | Total acylation degree | Type | A-mount* | Type | A-mount* | Type | A-mount* | Type | A-mount* | |
|---|---|---|---|---|---|---|---|---|---|---|---|---|
| 101 | 2.87 | 0 | 2.87 | A-21 | 1.5 | A-22 | 1.5 | C-7 | 3.0 | C-8 | 3.0 | Present invention |
| 102 | 2.87 | 0 | 2.87 | A-21 | 1.5 | A-22 | 1.5 | C-7 | 6.0 | C-8 | 6.0 | Present invention |
| 103 | 2.87 | 0 | 2.87 | A-30 | 2.8 | — | — | C-13 | 4.0 | C-14 | 2.0 | Present invention |
| 104 | 2.87 | 0 | 2.87 | A-21 | 2.0 | B-7 | 1.0 | C-7 | 6.0 | C-8 | 6.0 | Present invention |
| 105 | 2.87 | 0 | 2.87 | A-10 | 2.0 | — | — | C-7 | 6.0 | C-8 | 6.0 | Present invention |
| 106 | 1.9 | 0.9 | 2.8 | A-21 | 0.5 | A-22 | 0.5 | C-7 | 6.0 | C-8 | 6.0 | Present invention |
| 107 | 2.87 | 0 | 2.87 | A-21 | 1.5 | A-22 | 1.5 | IV-7 | 3.0 | IV-5 | 3.0 | Present invention |
| 108 | 2.87 | 0 | 2.87 | A-21 | 1.8 | B-7 | 0.7 | IV-7 | 6.0 | IV-5 | 6.0 | Present invention |
| 201 | 2.87 | 0 | 2.87 | A-21 | 1.5 | A-22 | 1.5 | Triphenyl phosphate | 3.0 | Biphenyl phosphate | 3.0 | Comparative |
| 202 | 2.87 | 0 | 2.87 | Example compound (1)-2 of JP-A-2003-344655 | 7.2 | — | — | C-7 | 3.0 | C-8 | 3.0 | Comparative |
| 203 | 2.87 | 0 | 2.87 | Example compound (1)-2 of JP-A-2003-344655 | 5.2 | — | — | Triphenyl phosphate | 3.0 | Biphenyl phosphate | 3.0 | Comparative |
| 204 | 2.87 | 0 | 2.87 | Example compound (1)-2 of JP-A-2003-344655 | 5.2 | — | — | Triphenyl phosphate | 6.0 | Biphenyl phosphate | 6.0 | Comparative |

*weight percent based on the weight of cellulose acylate.

hydrophobizing agents, and hydrophobizing agent amounts shown in Table 1, respectively.

Comparative Example 1

Production of Cellulose Acylate Films 201 to 204

<Preparation of Cellulose Acylate Solution>

Comparative cellulose acylate films 201 to 204 were produced in the same manner as Example 1 except for using the cellulose acylates, retarders, retarder amounts, hydrophobizing agents, and hydrophobizing agent amounts shown in Table 1, respectively.

(Measurement of Film Properties)

(1) Measurement of Retardation

The Re and Rth retardation values at a wavelength of 590 nm of the produced cellulose acylate films were measured

TABLE 2

| | Retardation under 25° C. and 60% RH | | Humidity dependency of $Rth_{(590)}$ |
| Sample No. | $Re_{(590)}$ (nm) | $Rth_{(590)}$ (nm) | |
|---|---|---|---|
| 101 | 65 | 205 | 28% |
| 102 | 62 | 201 | 21% |
| 103 | 73 | 221 | 24% |
| 104 | 63 | 180 | 19% |
| 105 | 43 | 170 | 23% |
| 106 | 59 | 205 | 19% |
| 107 | 70 | 230 | 25% |
| 108 | 74 | 241 | 20% |
| 201 | 67 | 209 | 38% |
| 202 | 51 | 182 | 33% |
| 203 | 42 | 184 | 41% |
| 204 | 40 | 164 | 31% |

Humidity dependency of $Rth_{(590)}$ is $[(Rth_{(590)}$ under 25° C. and 60%RH)–$(Rth_{(590)}$ under 25° C. and 80% RH)]/$[Rth_{(590)}$ under 25° C. and 60% RH]

It was clear from the results shown in Table 2 that the cellulose acylate films of the invention preferably had high retardations and small Rth humidity changes.

Example 3

Production of Polarizing Plate 101

(Saponification Treatment of Cellulose Acylate Film)

The cellulose acylate film 101 produced in Example 1 was soaked in a 1.3-mol/L aqueous sodium hydroxide solution at 55° C. for 2 minutes, washed in a water-washing bath at the room temperature, and neutralized by 0.05-mol/L sulfuric acid at 30° C. The film was washed again in the water-washing bath at the room temperature, and dried by a hot air at 100° C. The surface of the cellulose acylate film 101 was saponified in this manner, and used for producing a polarizing plate.

Further, a commercially available cellulose triacetate film FUJITAC TDBOUF manufactured by Fuji Photo Film Co., Ltd. was saponified in the same manner, and used for producing a polarizing plate.

(Production of Polarizer)

Iodine was adsorbed onto a stretched polyvinyl alcohol film to prepare a polarizer, and the cellulose acylate film 101 saponified above was bonded to one side of the polarizer using a polyvinyl alcohol adhesive. They were positioned such that the slow axis of the cellulose acylate film was parallel to the transmission axis of the polarizer.

The cellulose triacetate film saponified above was bonded to the other side of the polarizer by using a polyvinyl alcohol adhesive. A polarizing plate 101 was produced in this manner.

Example 4

Production of Polarizing Plates 102 to 108

Polarizing plates 102 to 108 were produced using the cellulose acylate films 102 to 108 in the same manner as Example 3.

Comparative Example 2

Production of Polarizing Plates 201 to 204

Polarizing plates 201 to 204 were produced using the cellulose acylate films 201 to 204 in the same manner as Example 3.

Example 5

Production and Evaluation of VA Liquid Crystal Display Device

A liquid crystal display device shown in FIG. 1 was produced. Thus, an upper polarizing plate 30, a VA mode liquid crystal cell 31 (an upper substrate, a liquid crystal layer, and a lower substrate), and a lower polarizing plate 32 were stacked in this order from the observation direction (from above), and a backlight source was placed. Each of the polarizing plates contained a polarizer 34 and protective films 33 disposed on the both sides thereof. In the following examples, a commercially available polarizing plate HLC2-5618 available from Sanritz Corporation was used as the upper polarizing plate, and the above produced polarizing plate was used as the lower polarizing plate.

(Production of Liquid Crystal Cell)

A liquid crystal cell was produced by adding a liquid crystal material with a negative dielectric anisotropy (MLC6608 available from Merck) dropwise into a gap between substrates having a cell gap of 3.6 μm, and by sealing the gap to form a liquid crystal layer between the substrate. The retardation of the liquid crystal layer, the product Δn·d of the thickness d (μm) of the liquid crystal layer and the refractive index anisotropy Δn, was 300 nm. It should be noted that the liquid crystal material was vertically aligned.

Polarizing plates were each bonded by an adhesive to the observer side and the backlight side of the VA mode cell 31 for the liquid crystal display device using the vertically aligning type liquid crystal cell (shown in FIG. 1) in the manner that a commercially available super high contrast product HLC2-5618 available from Sanritz Corporation was bonded as the upper polarizing plate 30, and the polarizing plate 101 produced in Example 3 was bonded as the lower polarizing plate 32 such that the cellulose acylate film 101 of the invention faced the liquid crystal cell. They were placed in the crossed nicols state such that the transmission axis of the observer side polarizing plate extended in the vertical direction and the transmission axis of the backlight side polarizing plate extended in the horizontal direction.

A liquid crystal display device was produced in the same manner except for using the polarizing plate 201 of Comparative Example 2.

It was found that, as compared with the liquid crystal display device using the polarizing plate 201 containing the cellulose acylate film 201 of Comparative Example 2, the liquid crystal display device using the polarizing plate 101 containing the cellulose acylate film 101 of the invention showed a smaller contrast viewing angle change due to the environmental humidity.

Example 6

Production of Polarizing Plate Having Optical Compensatory Function (1) Production of Optical Compensatory Film (Saponification of Cellulose Acylate Film)

The following composition liquid was applied at 5.2 mL/m² to the cellulose acylate film 105 produced in Example 2, and dried at 60° C. for 10 seconds. The film surface was washed by water flow for 10 seconds, and dried by air flow at 25° C.

| (Composition of saponification solution) | |
|---|---|
| Isopropyl alcohol | 818 parts by mass |
| Water | 167 parts by mass |
| Propylene glycol | 187 parts by mass |
| EMALEX available from Nihon Emulsion Co., Ltd. | 10 parts by mass |
| Potassium hydroxide | 67 parts by mass |

A coating liquid having the following composition was applied to the saponified surface of the cellulose acylate film 105 by a #14 wire bar coater at a ratio of 24 ml/m². The applied liquid was dried by 60° C. hot air for 60 seconds and further dried by 90° C. hot air for 150 seconds.

Then the resulting film was subjected to a rubbing treatment at an angle of 45° against the stretching direction of the cellulose acylate film 105, which was approximately equal to the slow axis direction.

| (Composition of alignment film coating liquid) | |
| --- | --- |
| Following modified polyvinyl alcohol | 20 parts by mass |
| Water | 360 parts by mass |
| Methanol | 120 parts by mass |
| Glutaraldehyde (crosslinking agent) | 1.0 parts by mass |

Modified polyvinyl alcohol

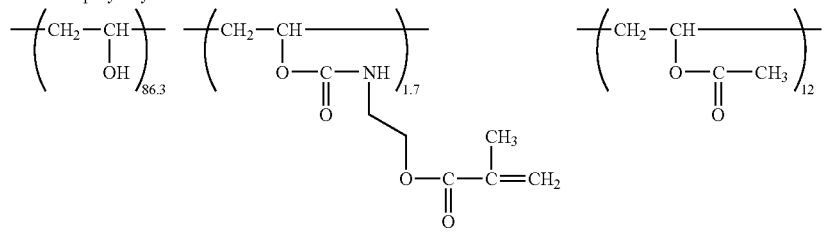

(Formation of Optically Anisotropic Layer)

91 parts by mass of the following discotic compound, 9 parts by mass of an ethylene oxide-modified trimethylolpropane triacrylate V#360 available from Osaka Organic Chemical Industry Ltd., 1.5 parts by mass of a cellulose acetate butyrate CAB531-1 available from Eastman Chemicals Co., 3 parts by mass of a photopolymerization initiator IRGACURE 907 available from Ciba-Geigy, and 1 part by mass of a sensitizer KAYACURE DETX available from Nippon Kayaku Co., Ltd. were dissolved in 214.2 parts by mass of methyl ethyl ketone to obtain a coating liquid. The coating liquid was applied to the alignment film by a #3 wire bar coater at 5.2 mL/m². This was attached to a metal frame and heated at 130° C. for 2 minutes in a constant temperature bath to align the discotic compound. The resultant was then irradiated with ultraviolet ray at 90° C. for 1 minute by using a 120-W/cm high-pressure mercury vapor lamp to polymerize the discotic compound, and was cooled to the room temperature. Thus an optically anisotropic layer was formed to prepare an optical compensatory film 105.

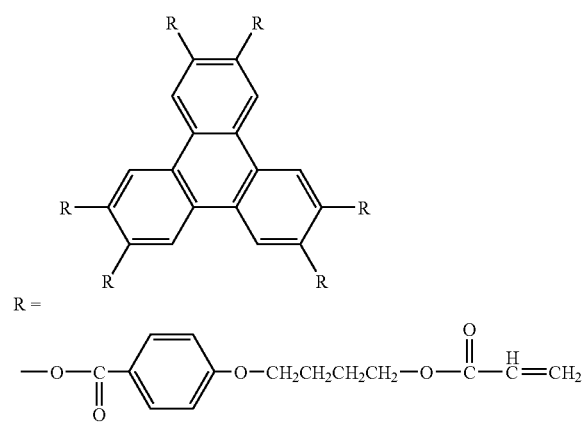

(Saponification of Optical Compensatory Film)

The optical compensatory film 105 was saponified in the same manner as Example 3.

(2) Production of Polarizing Plate (Production of Polarizer)

Iodine was adsorbed onto a stretched polyvinyl alcohol film to prepare a polarizer. The cellulose acylate film 105 of the produced optical compensatory film 105 was bonded to one side of the polarizer using a polyvinyl alcohol adhesive. They were positioned such that the slow axis of the cellulose acylate film 105 was parallel to the transmission axis of the polarizer.

A commercially available cellulose triacetate film FUJI-TAC TD80UF manufactured by Fuji Photo Film Co., Ltd. was saponified in the same manner as Example 3, and bonded to the other side of the polarizer (the side not having the optical compensatory film) by using a polyvinyl alcohol adhesive, to produce a polarizing plate 105-2.

Example 8

Production of Liquid Crystal Display Device (Production of Bend Alignment Mode Liquid Crystal Cell)

A polyimide film was formed as an alignment film on a glass substrate having an ITO electrode, and then was subjected to a rubbing treatment. Thus obtained two glass substrates were made to face each other such that the rubbing directions were parallel, and the cell gap therebetween was controlled at 5.7 μm. A liquid crystalline compound having Δn of 0.1396 (ZLI1132 available from Merck) was injected to the cell gap, to produce a bend alignment mode liquid crystal cell.

(Production of Liquid Crystal Display Device)

The produced bend alignment cell was bonded to and sandwiched between two ellipsoidal polarizing plates 105-2. They were placed such that the optically anisotropic layers of the polarizing plates faced the cell substrate, and the rubbing direction of the liquid crystal cell was parallel and opposite to the rubbing direction of the facing optically anisotropic layer.

It was found that the liquid crystal display device using the polarizing plate of the invention had a small contrast viewing angle change due to environmental humidity.

The present disclosure relates to the subject matter contained in Japanese Patent Application No. 160934/2005 filed on Jun. 1, 2005 and Japanese Patent Application No. 121351/2006 filed on Apr. 25, 2006, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and

What is claimed is:

1. A cellulose acylate film comprising at least one compound having at least one hydrogen-donating group capable of forming a hydrogen bond and at least one aromatic ring, and at least one compound represented by the following formula (1):

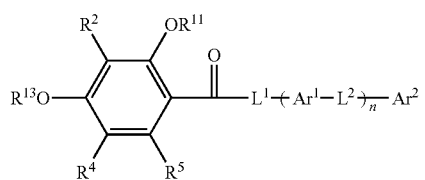

Formula (1)

wherein $R^2$, $R^4$, and $R^5$ each represent a hydrogen atom or a substituent, $R^{11}$ and $R^{13}$ each represent a hydrogen atom or an alkyl group, $L^1$ and $L^2$ each represent a single bond or a divalent linking group, $Ar^1$ represents an arylene group or a divalent aromatic heterocyclic group, $Ar^2$ represents an aryl group or a monovalent aromatic heterocyclic group, n represents an integer of 3 to 5, and each of $L^2$'s and each of $Ar^1$'s in the n units may be the same or different respectively.

2. The cellulose acylate film according to claim 1, wherein the compound having at least one hydrogen-donating group capable of forming a hydrogen bond and at least one aromatic ring is represented by the following formula (2):

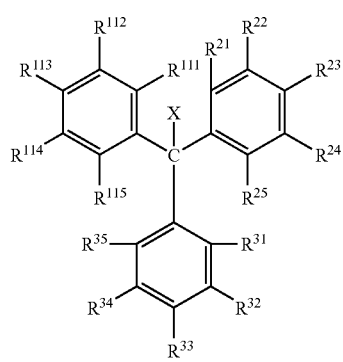

Formula (2)

wherein X represents a substituted or unsubstituted amino group, a substituted or unsubstituted acylamino group, a substituted or unsubstituted alkoxycarbonylamino group, a substituted or unsubstituted aryloxycarbonylamino group, a substituted or unsubstituted sulfonylamino group, a hydroxyl group, a mercapto group, or a carboxyl group, and $R^{111}$, $R^{112}$, $R^{113}$, $R^{114}$, $R^{115}$, $R^{21}$, $R^{22}$, $R^{23}$, $R^{24}$, $R^{25}$, $R^{31}$, $R^{32}$, $R^{33}$, $R^{34}$, and $R^{35}$ each represent a hydrogen atom or a substituent.

3. The cellulose acylate film according to claim 1, wherein the compound having at least one hydrogen-donating group capable of forming a hydrogen bond and at least one aromatic ring is represented by the following formula (B):

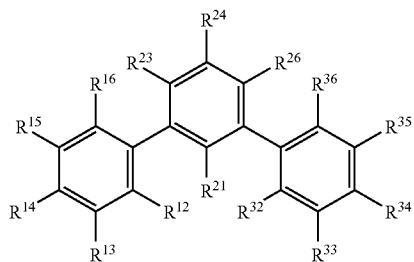

Formula (B)

wherein $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ represent a hydrogen atom or a substituent, at least one of $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$, and $R^{36}$ is an amino group, an acylamino group, an alkoxycarbonylamino group, an aryloxycarbonylamino group, a sulfonylamino group, a hydroxyl group, a mercapto group or a carboxyl group.

4. The cellulose acylate film according to claim 1, wherein the cellulose acylate film satisfies the following inequalities (A) and (B):

$$20 \text{ nm} \leq Re_{(590)} \leq 250 \text{ nm} \quad (A)$$

$$40 \text{ nm} \leq Rth_{(590)} \leq 400 \text{ nm} \quad (B)$$

wherein $Re_{(590)}$ and $Rth_{(590)}$ represent an in-plane retardation and a retardation in the thickness direction at a wavelength of 590 nm, respectively.

5. The cellulose acylate film according to claim 1, wherein the cellulose acylate film satisfies the following condition:

$$0\% \leq (Rth_{(590)} \text{ under } 25° \text{C. and } 10\% \text{ RH} - Rth_{(590)} \text{ under } 25° \text{C. and } 80\% \text{ RH})/(Rth_{(590)} \text{ under } 25° \text{C. and } 60\% \text{ RH}) \times (100\%) \leq 3\%$$

wherein $Rth_{(590)}$ represents a retardation in the thickness direction at a wavelength of 590 nm.

6. An optical compensatory film comprising the cellulose acylate film according to claim 1.

7. A polarizing plate comprising a polarizing film and protective films disposed on both sides of the polarizing film, wherein at least one of the protective films is the cellulose acylate film according to claim 1.

8. A liquid crystal display device comprising a liquid crystal cell and 2 polarizing plates disposed on both sides of the liquid crystal cell, wherein at least one of the polarizing plates is the polarizing plate according to claim 7.

9. The liquid crystal display device according to claim 8, wherein the display mode of the display device is a VA mode.

10. The liquid crystal display device according to claim 8, wherein the display mode of the display device is an OCB mode.

11. The cellulose acylate film according to claim 1, wherein n is 3 or 4.

* * * * *